US011971018B2

(12) United States Patent
Daniel et al.

(10) Patent No.: US 11,971,018 B2
(45) Date of Patent: Apr. 30, 2024

(54) SYSTEMS, DEVICES AND METHODS FOR ELECTRICITY PROVISION, USAGE MONITORING, ANALYSIS, AND ENABLING IMPROVEMENTS IN EFFICIENCY

(71) Applicant: Moixa Energy Holdings Limited, London (GB)

(72) Inventors: Simon Richard Daniel, Farnham (GB); Christopher Verity Wright, Stroud (GB)

(73) Assignee: Moixa Energy Holdings Limited (GB)

( * ) Notice: Subject to any disclaimer, the term of this patent is extended or adjusted under 35 U.S.C. 154(b) by 0 days.

(21) Appl. No.: 17/874,683

(22) Filed: Jul. 27, 2022

(65) Prior Publication Data

US 2023/0009776 A1 Jan. 12, 2023

Related U.S. Application Data

(63) Continuation of application No. 15/250,000, filed on Aug. 29, 2016, now Pat. No. 11,437,822, which is a
(Continued)

(30) Foreign Application Priority Data

Sep. 13, 2008 (GB) ..................... 0816721

(51) Int. Cl.
  *G05F 1/66* (2006.01)
  *F03D 9/25* (2016.01)
  (Continued)

(52) U.S. Cl.
  CPC ................. *F03D 9/25* (2016.05); *G05F 1/66* (2013.01); *H02J 1/14* (2013.01); *H02J 3/28* (2013.01);
  (Continued)

(58) Field of Classification Search
  CPC ...... F03D 9/25; F03D 9/34; G05F 1/66; H02J 1/14; H02J 3/28; H02J 3/388; H02J 4/00;
  (Continued)

(56) References Cited

U.S. PATENT DOCUMENTS 4,858,141 A * 8/1989 Hart .................... G01R 21/1331
  340/657
4,990,099 A 2/1991 Marin
  (Continued)

FOREIGN PATENT DOCUMENTS

| EP | 0409226 | 1/1991 |
| EP | 1198056 | 4/2002 |

(Continued)

OTHER PUBLICATIONS

Lo, Yu-Kang, Ting-Peng Lee, and Kuan-Hung Wu. "Grid-connected photovoltaic system with power factor correction." IEEE Transactions on Industrial Electronics 55.5 (2008): 2224-2227. (Year: 2008).*

(Continued)

*Primary Examiner* — Michael W Choi
(74) *Attorney, Agent, or Firm* — Van Pelt, Yi & James LLP

(57) ABSTRACT

The present invention relates generally to systems, devices and methods for the efficient use of utilities, more particularly to the distribution and provision of electricity supply at appropriate voltages, monitoring and usage by end devices, and to facilitating consumers in changing their energy usage behaviour, and to adopt and easily install appropriate sustainable, energy efficient or renewable technologies. Said end devices typically including traditional electric, electronic and lighting appliances requiring AC or DC power provision or low voltage DC power via AC/DC converters.

16 Claims, 17 Drawing Sheets

Related U.S. Application Data continuation of application No. 14/489,105, filed on Sep. 17, 2014, now Pat. No. 11,418,040, which is a continuation of application No. 12/559,192, filed on Sep. 14, 2009, now Pat. No. 8,849,471.

(51) Int. Cl.

| | | |
|---|---|---|
| *H02J 1/14* | (2006.01) | |
| *H02J 3/28* | (2006.01) | |
| *H02J 3/38* | (2006.01) | |
| *H02J 4/00* | (2006.01) | |
| *H02S 10/12* | (2014.01) | |
| *H02S 30/20* | (2014.01) | |
| *H02S 50/00* | (2014.01) | |
| *H04L 12/10* | (2006.01) | |
| *H04L 12/40* | (2006.01) | |
| *F03D 9/34* | (2016.01) | |

(52) U.S. Cl.
CPC ............... *H02J 3/388* (2020.01); *H02J 4/00* (2013.01); *H02S 10/12* (2014.12); *H02S 30/20* (2014.12); *H02S 50/00* (2013.01); *H04L 12/10* (2013.01); *H04L 12/40045* (2013.01); *F03D 9/34* (2016.05); *F05B 2240/211* (2013.01); *F05B 2240/221* (2013.01); *F05B 2240/911* (2013.01); *F05B 2240/9112* (2013.01); *Y02B 10/30* (2013.01); *Y02E 10/72* (2013.01); *Y02E 10/728* (2013.01); *Y02E 10/76* (2013.01); *Y02E 70/30* (2013.01)

(58) Field of Classification Search
CPC ...... H02J 2300/40; H02S 10/12; H02S 30/20; H02S 50/00; H04L 12/10; H04L 12/40045; F05B 2240/211; F05B 2240/221; F05B 2240/911; F05B 2240/9112; Y02B 10/30; Y02E 10/72; Y02E 10/728; Y02E 10/76; Y02E 70/30; Y02E 10/56

See application file for complete search history.

(56) References Cited

U.S. PATENT DOCUMENTS

| | | | |
|---|---|---|---|
| 5,297,015 A | 3/1994 | Miyazaki | |
| 5,973,948 A | 10/1999 | Hahn | |
| 6,362,987 B1 | 3/2002 | Yurek | |
| 6,528,957 B1 | 3/2003 | Luchaco | |
| 6,933,627 B2 | 8/2005 | Wilhelm | |
| 6,993,417 B2 | 1/2006 | Osann, Jr. | |
| 7,108,560 B1 | 9/2006 | Chou | |
| 7,274,975 B2 | 9/2007 | Miller | |
| 7,483,272 B2 | 1/2009 | Hussaini | |
| 7,885,917 B2 | 2/2011 | Kuhns | |
| 7,929,327 B2 | 4/2011 | Haines | |
| 8,004,101 B2 | 8/2011 | Aaron | |
| 10,290,063 B2 | 5/2019 | Yang | |
| 11,262,386 B2 | 3/2022 | Donnal | |
| 11,316,367 B2 | 4/2022 | Forbes, Jr. | |
| 2002/0163931 A1 | 11/2002 | Lee | |
| 2003/0085621 A1 | 5/2003 | Potega | |
| 2003/0126060 A1 | 7/2003 | Lof | |
| 2004/0117330 A1 | 6/2004 | Ehlers | |
| 2005/0081069 A1 | 4/2005 | Pincu | |
| 2005/0116836 A1 | 6/2005 | Perry | |
| 2005/0173989 A1 | 8/2005 | Wu | |
| 2005/0248877 A1 | 11/2005 | Kim | |
| 2006/0214510 A1 | 9/2006 | Patel | |
| 2008/0039980 A1 | 2/2008 | Pollack | |
| 2008/0082276 A1 | 4/2008 | Rivers | |
| 2008/0114499 A1* | 5/2008 | Hakim | G06Q 50/06 700/291 |
| 2008/0140565 A1 | 6/2008 | Debenedetti | |
| 2008/0167756 A1* | 7/2008 | Golden | G06N 5/04 700/297 |
| 2008/0185451 A1 | 8/2008 | Simon | |
| 2008/0243391 A1 | 10/2008 | Ohshiro | |
| 2008/0262857 A1* | 10/2008 | Perera | H02J 3/008 705/1.1 |
| 2009/0045804 A1 | 2/2009 | Durling | |
| 2009/0100275 A1 | 4/2009 | Chang | |
| 2009/0152942 A1 | 6/2009 | Waite | |
| 2009/0195349 A1* | 8/2009 | Frader-Thompson | G01D 4/002 340/3.1 |
| 2009/0307178 A1 | 12/2009 | Kuhns | |
| 2010/0003848 A1 | 1/2010 | Scott | |
| 2010/0007473 A1 | 1/2010 | Fadell | |
| 2010/0076615 A1* | 3/2010 | Daniel | H02J 1/14 703/2 |
| 2010/0082499 A1 | 4/2010 | Luff | |
| 2010/0305889 A1 | 12/2010 | Tomlinson, Jr. | |
| 2012/0068692 A1 | 3/2012 | Patel | |
| 2023/0009776 A1* | 1/2023 | Daniel | H04L 12/10 |

FOREIGN PATENT DOCUMENTS

| | | |
|---|---|---|
| EP | 1263108 | 12/2002 |
| GB | 2375611 | 11/2002 |
| GB | 2408592 | 11/2005 |
| GB | 2458699 | 9/2009 |
| GB | 2462421 | 2/2010 |
| JP | 2005224009 | 8/2005 |
| WO | 200106612 | 1/2001 |
| WO | 2002021659 | 3/2002 |
| WO | 2006092621 | 9/2006 |
| WO | 2006117550 | 11/2006 |
| WO | 2007116221 | 10/2007 |
| WO | 2008007345 | 1/2008 |
| WO | 2008009903 | 1/2008 |
| WO | 2008071995 | 6/2008 |
| WO | 2008107655 | 9/2008 |
| WO | 2008139176 | 11/2008 |
| WO | 2009010734 | 1/2009 |
| WO | 2009020743 | 2/2009 |
| WO | 2009044111 | 4/2009 |

OTHER PUBLICATIONS

Kim, Seul-Ki, et al. "Dynamic modeling and control of a grid-connected hybrid generation system with versatile power transfer." IEEE transactions on industrial electronics 55.4 (2008): 1677-1688. (Year: 2008).*

Cheng et al., "Electric-Load Intelligence (E-LI): Concept and Applications," TENCON 2006—2006 IEEE Region 10 Conference, Hong Kong, 2006, pp. 1-4, doi: 10.1109/TENCON.2006.343687. (Year: 2006).

English Abstract of Japanese Application No. 2005224009 filed Feb. 5, 2004 (1 pg.).

European Patent Application No. 20184552.6 Extended European Search Report dated Oct. 26, 2020 (13 pages).

F. Sultanem, "Using appliance signatures for monitoring residential loads at meter panel level." IEEE Transactions on Power Delivery 6.4 (1991): 1380-1385. (Year: 1991).

GB Search and Examination Report of Application No. GB 1106089.4, dated Mar. 14, 2012 (5 pgs).

George William Hart, "Nonintrusive appliance load monitoring." Proceedings of the IEEE 80.12 (1992): 1870-1891. (Year: 1992).

Kok et al., "PowerMatcher: Multiiagent Control in the Electricity Infrastructure", Proceedings of AAMAS '03 Second International Conference on Autonomous Agents and Multiagent Systems, Melbourne, VIC, Australia—Jul. 14-18, 2003, pp. 75-82.

Lee et al., "Estimation of variable-speed-drive power consumption from harmonic content," in IEEE Transactions on Energy Conversion, vol. 20, No. 3, pp. 566-574, Sep. 2005, doi: 10.1109/TEC.2005.852963. (Year: 2005).

(56) References Cited

OTHER PUBLICATIONS

Montoya et al., "Remote Monitoring and Control System of Physical Variables of a Greenhouse through a 1-Wire Network" frm T. Sobh and K. Elleithy (eds.), Advances in Systems, Computing Sciences and Software Engineering, 2006, pp. 291-296.
Pellis, "The DC Low-Voltage House", Report of a Graduation Project for the Eindhoven University of Technology, Completed at the Netherlands Energy Research Foundation ECN, Report No. ECN-C-97-058, "ftp://nrg-nl.com/pub/www/library/report/1997/c97058.pdf", Sep. 1997, pp. 1-80.
Roos, Using Neural Networks for Non-intrusive Monitoring of Industrial Electrical Loads, 1994, In: Proc. 1994 IEEE Instrumentation and Measurement Technology Conference, pp. 1115-1118 (Year: 1994).
Sarar, "A Galvanically Isolated Power Converter Module for DC Zonal Electric Distribution Systems", Naval Post Graduate School, Monterey, CA, Thesis, "http://www.dtic.mil/dtic/tr/fulltext/u2/a445297.pdf", Mar. 2006, pp. 1-75.
Translation of Japanese Application No. 2005224009 filed Feb. 5, 2004 (4pgs).
Yang et al., "Design a neural network for features selection in non-intrusive monitoring of industrial electrical loads." 2007 11th International Conference on Computer Supported Cooperative Work in Design. IEEE, 2007. (Year: 2007).

\* cited by examiner

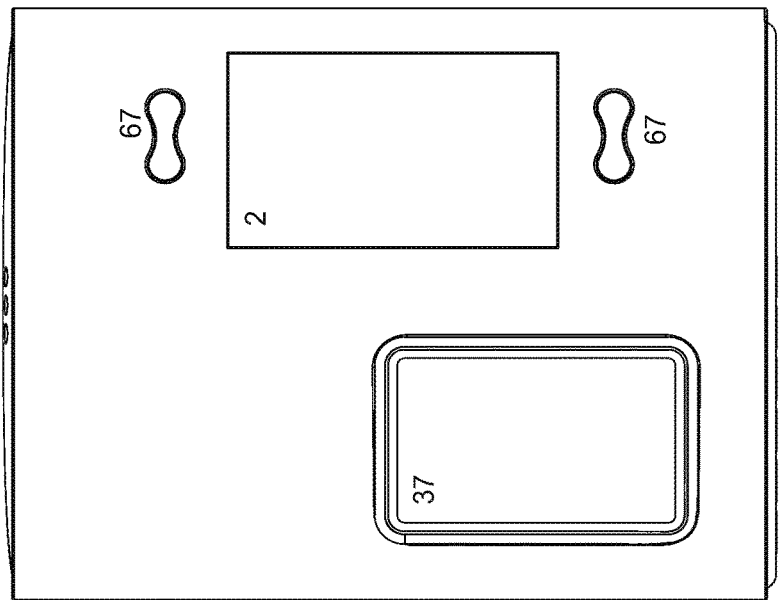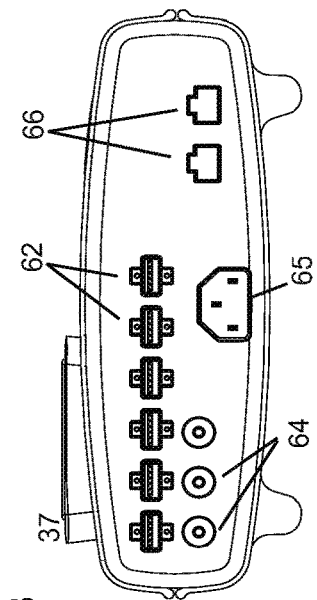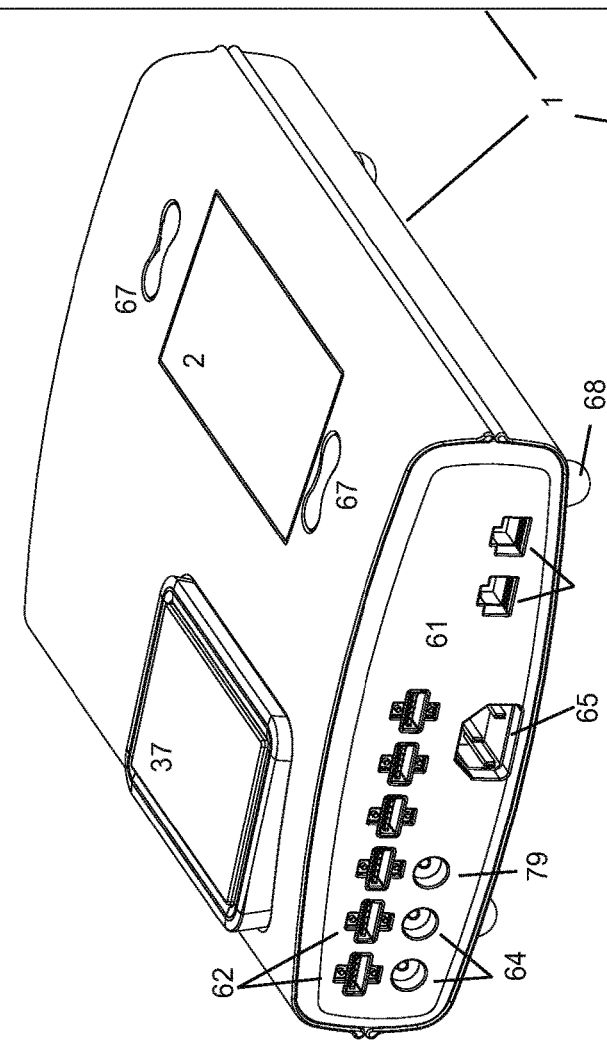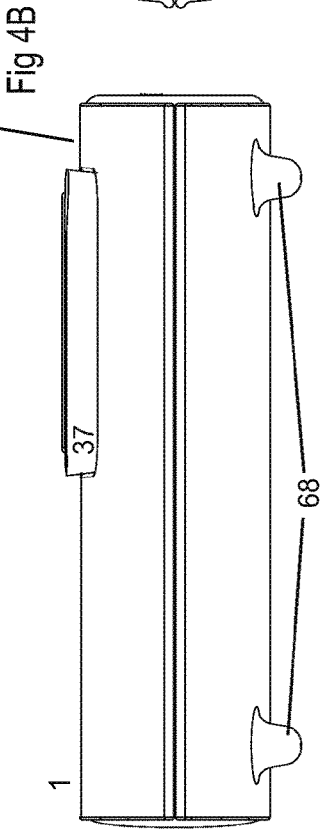

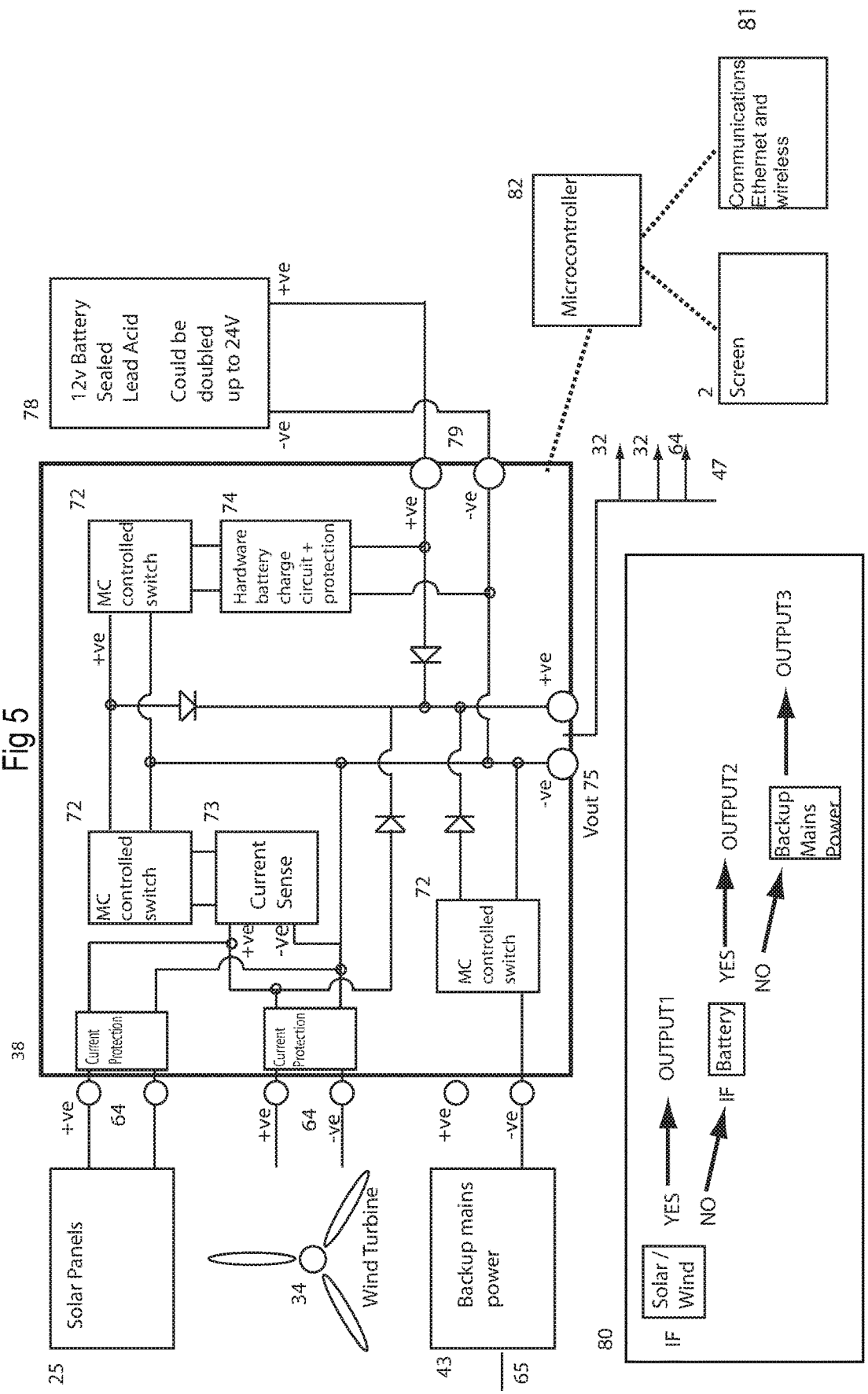

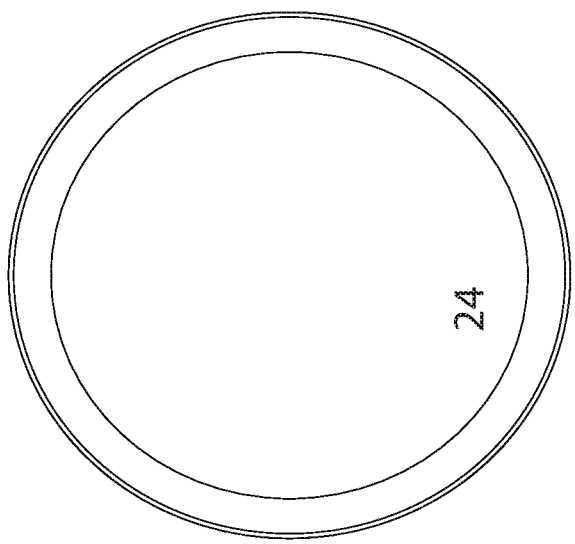
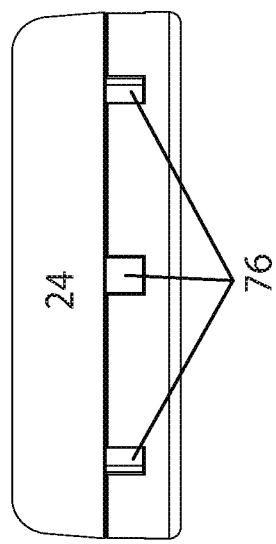
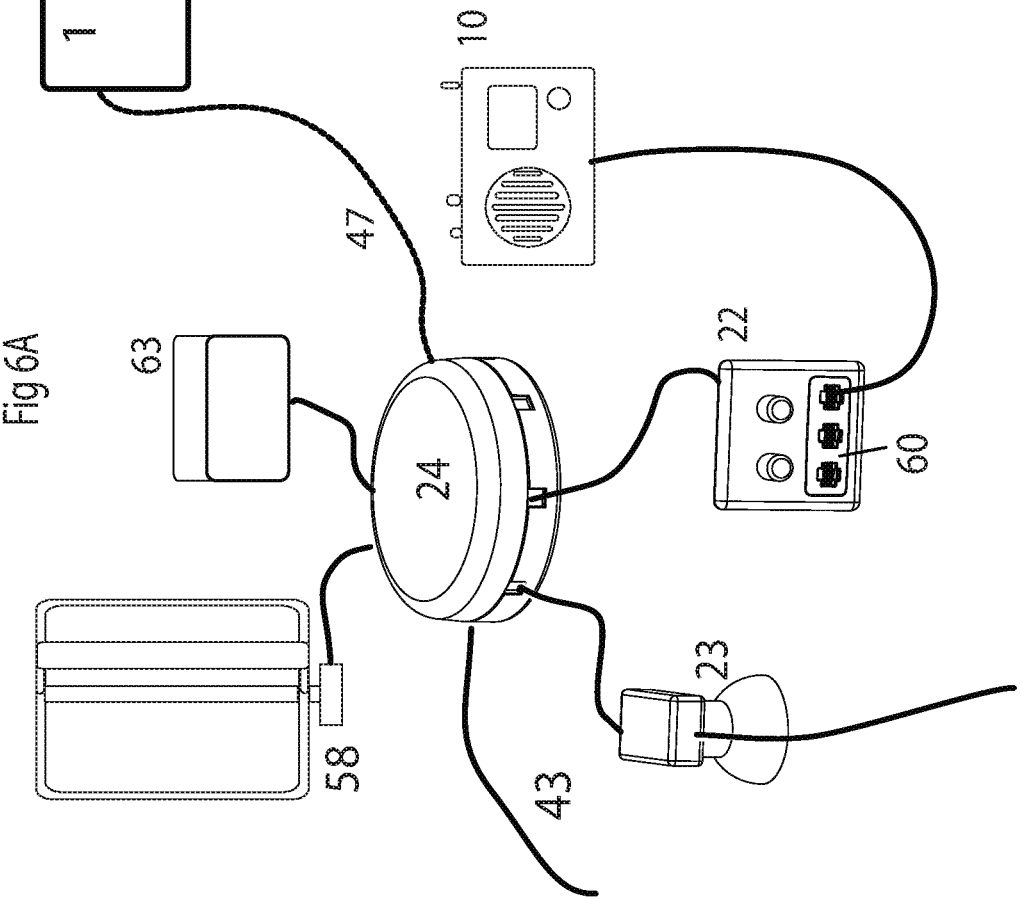

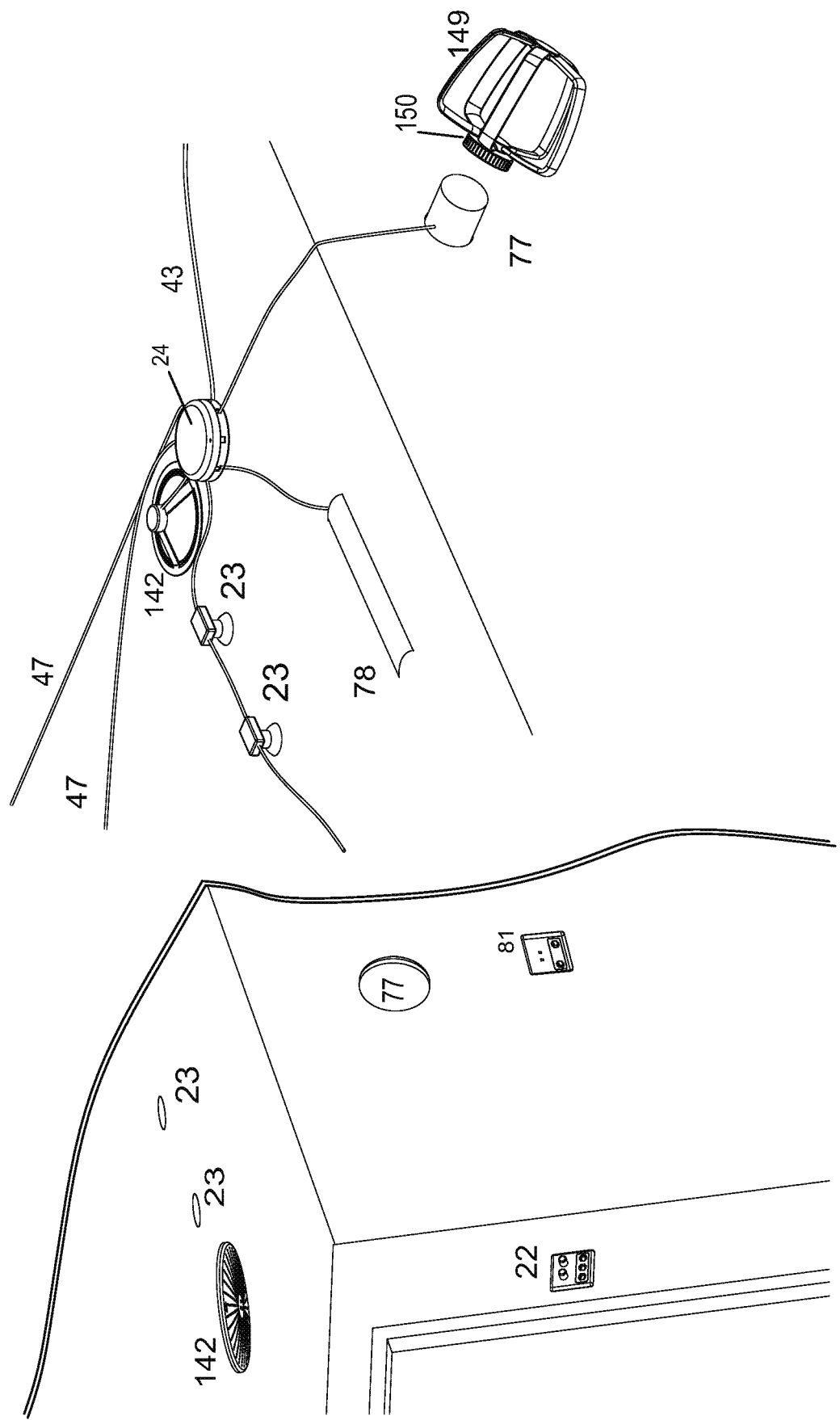

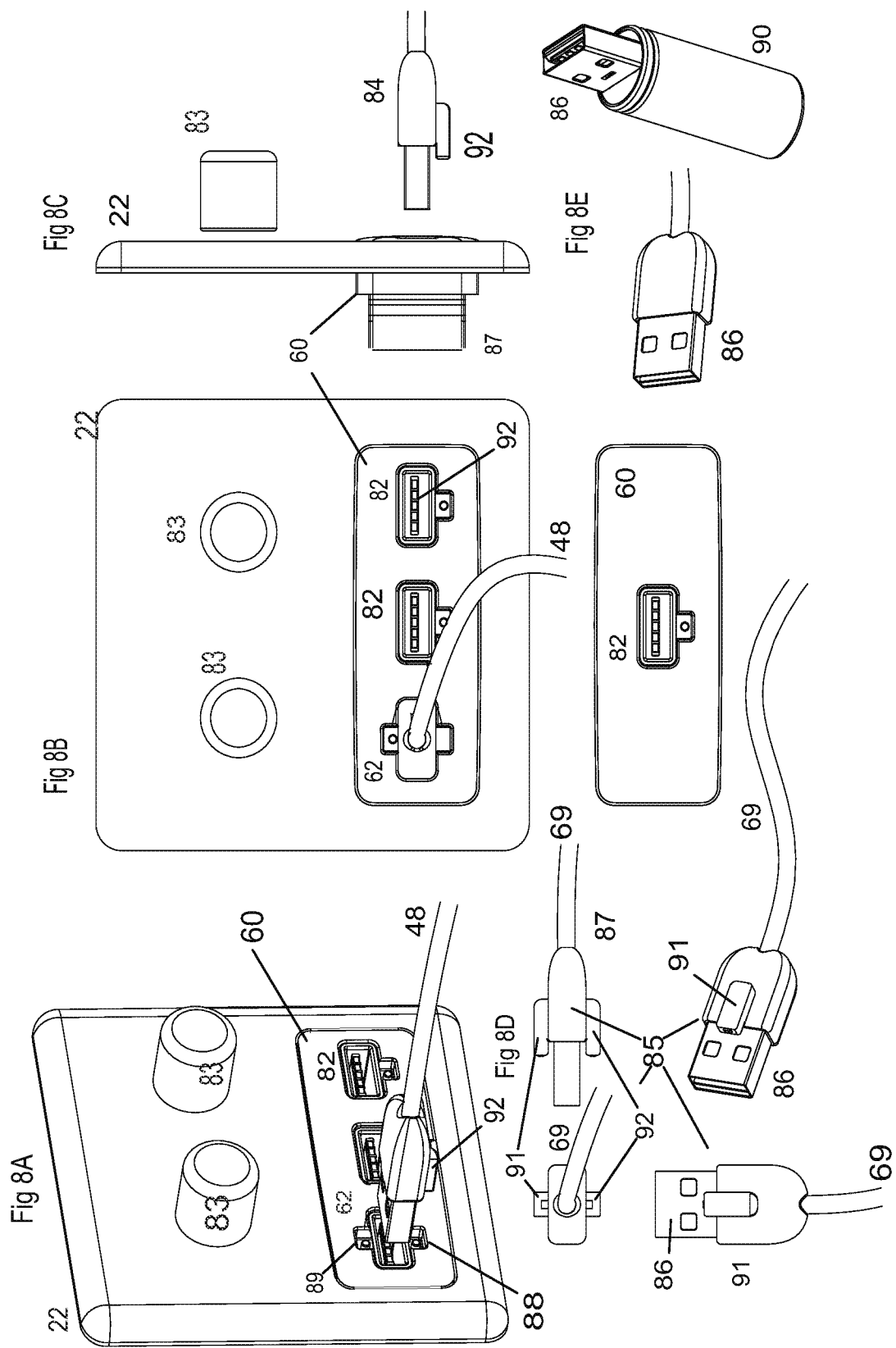

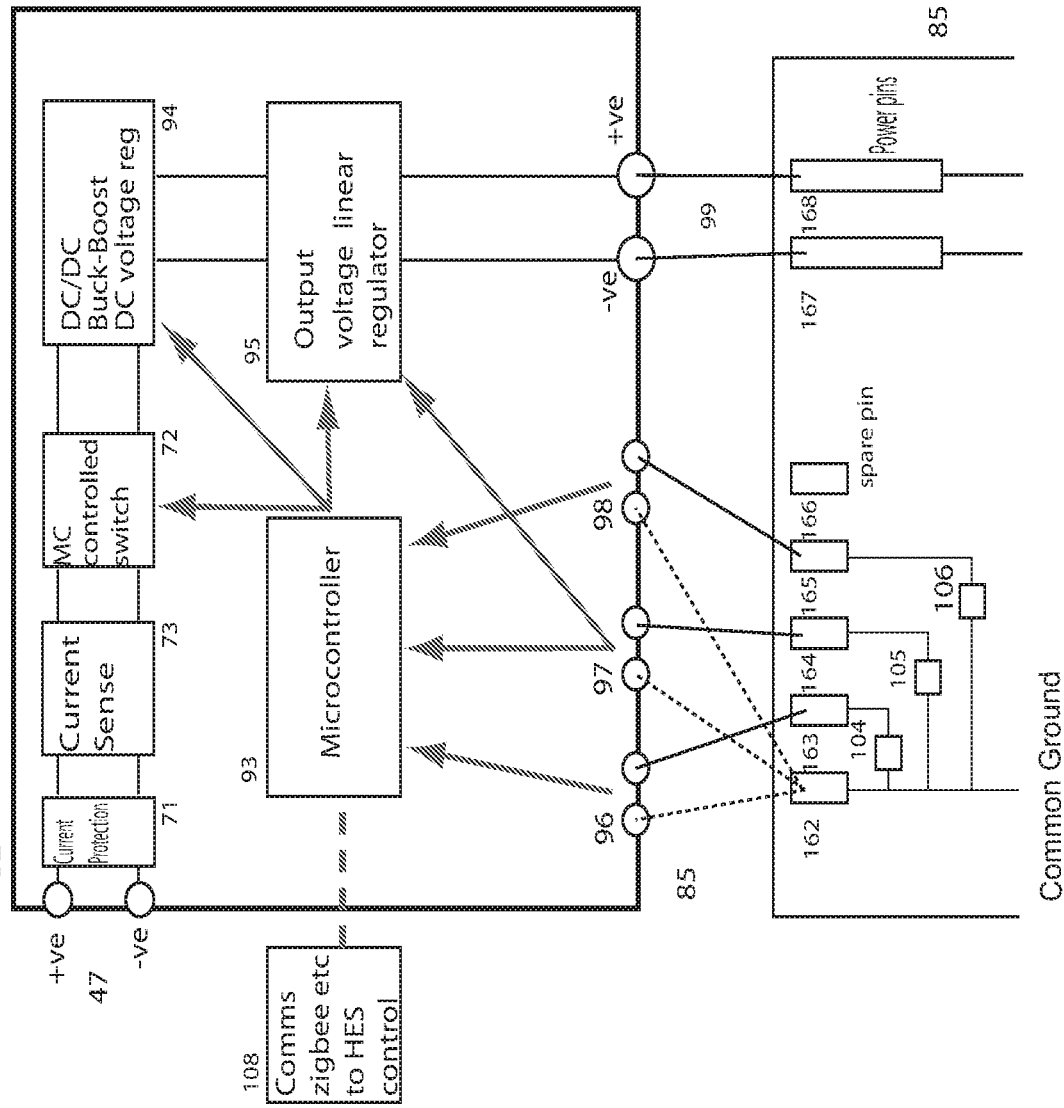

Fig 11A
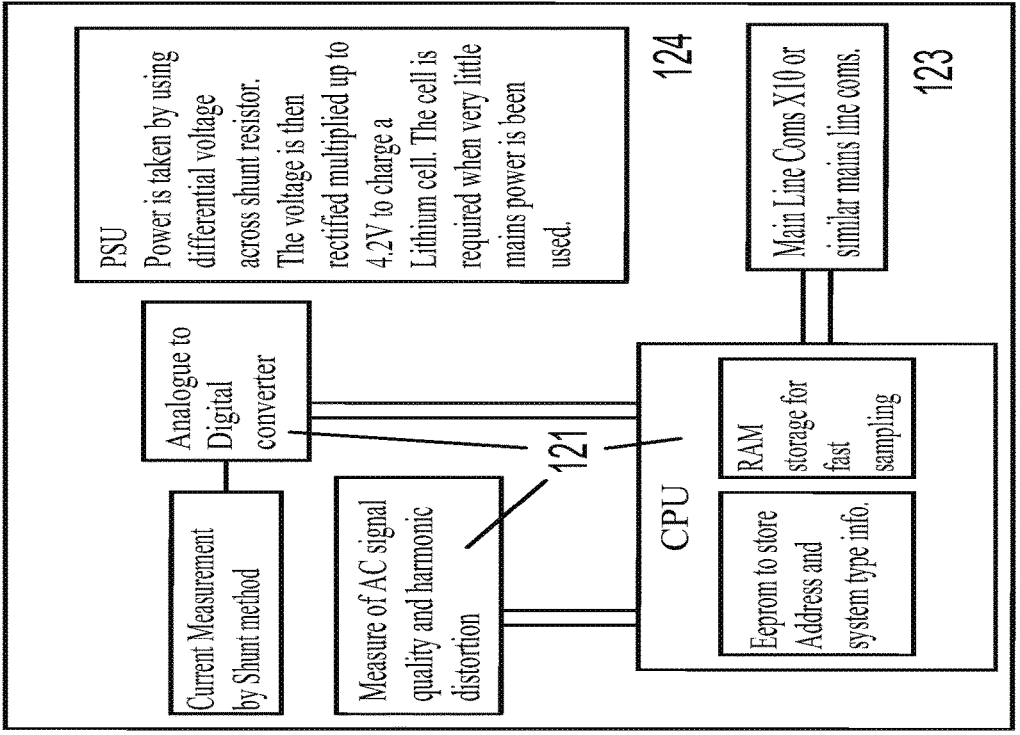
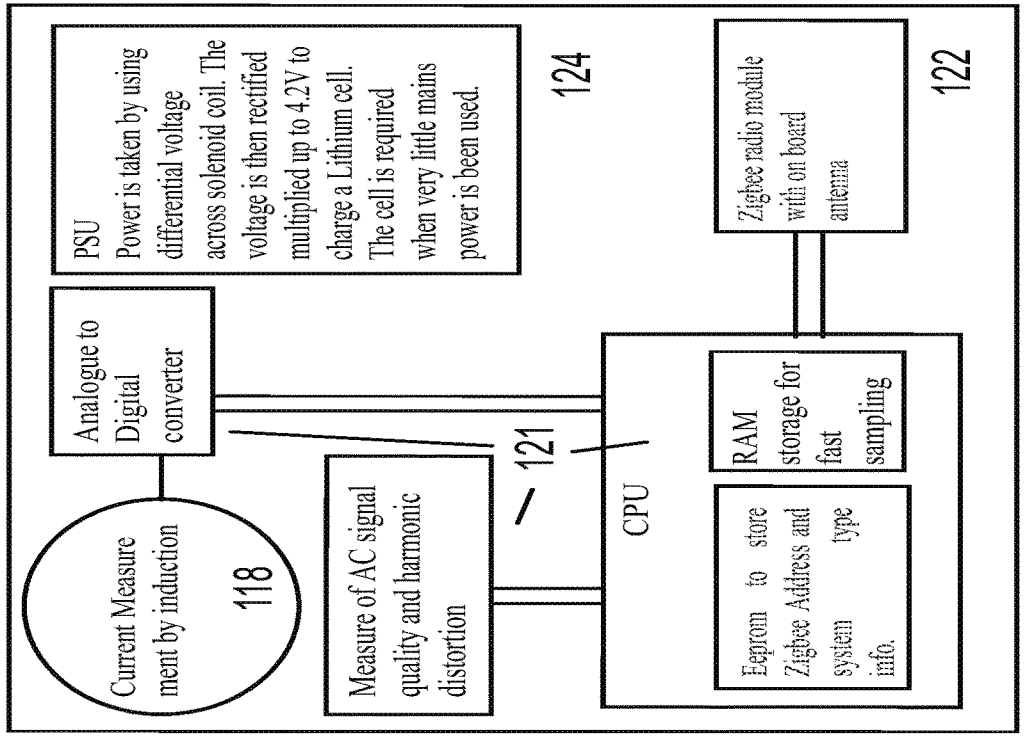

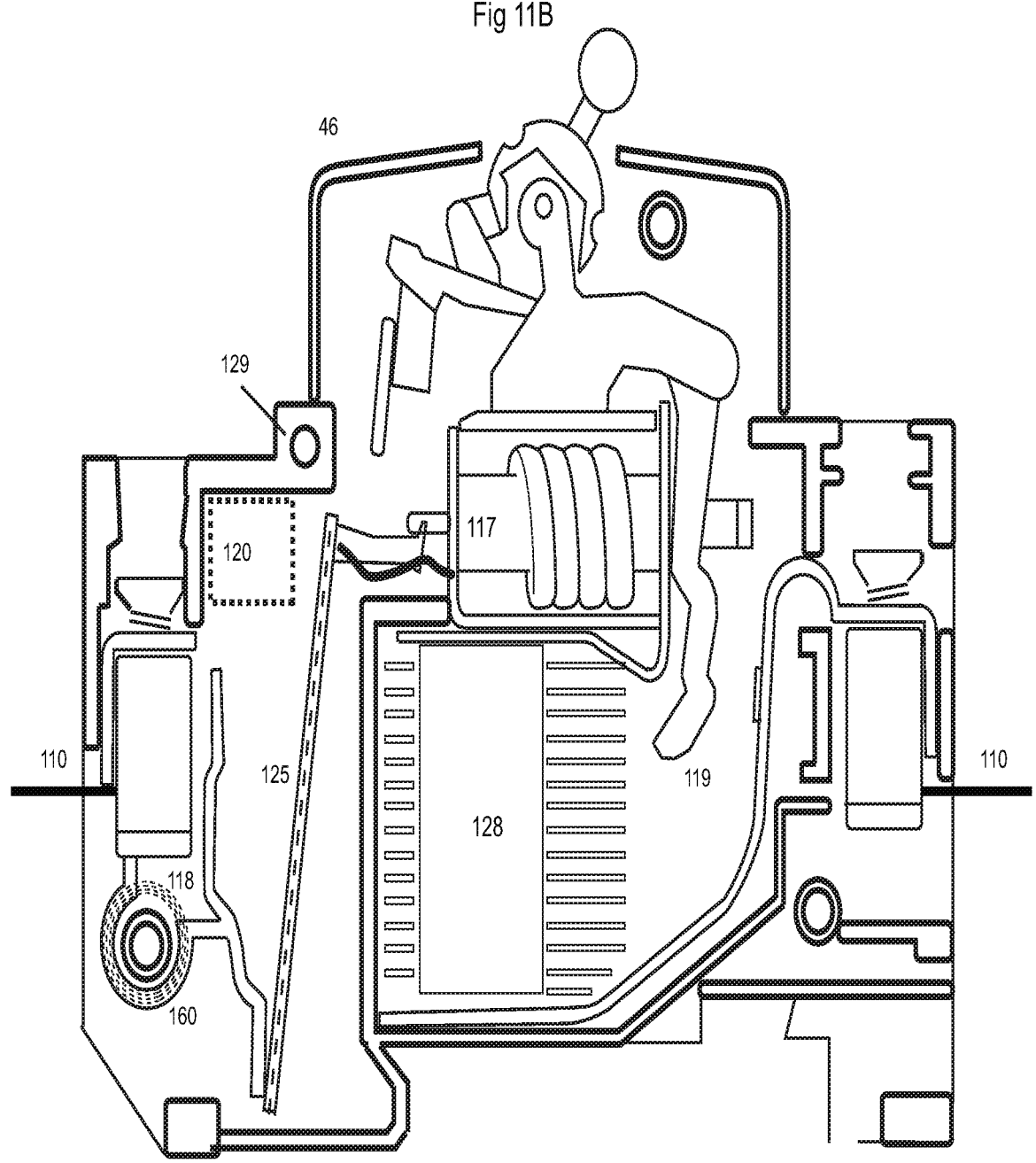

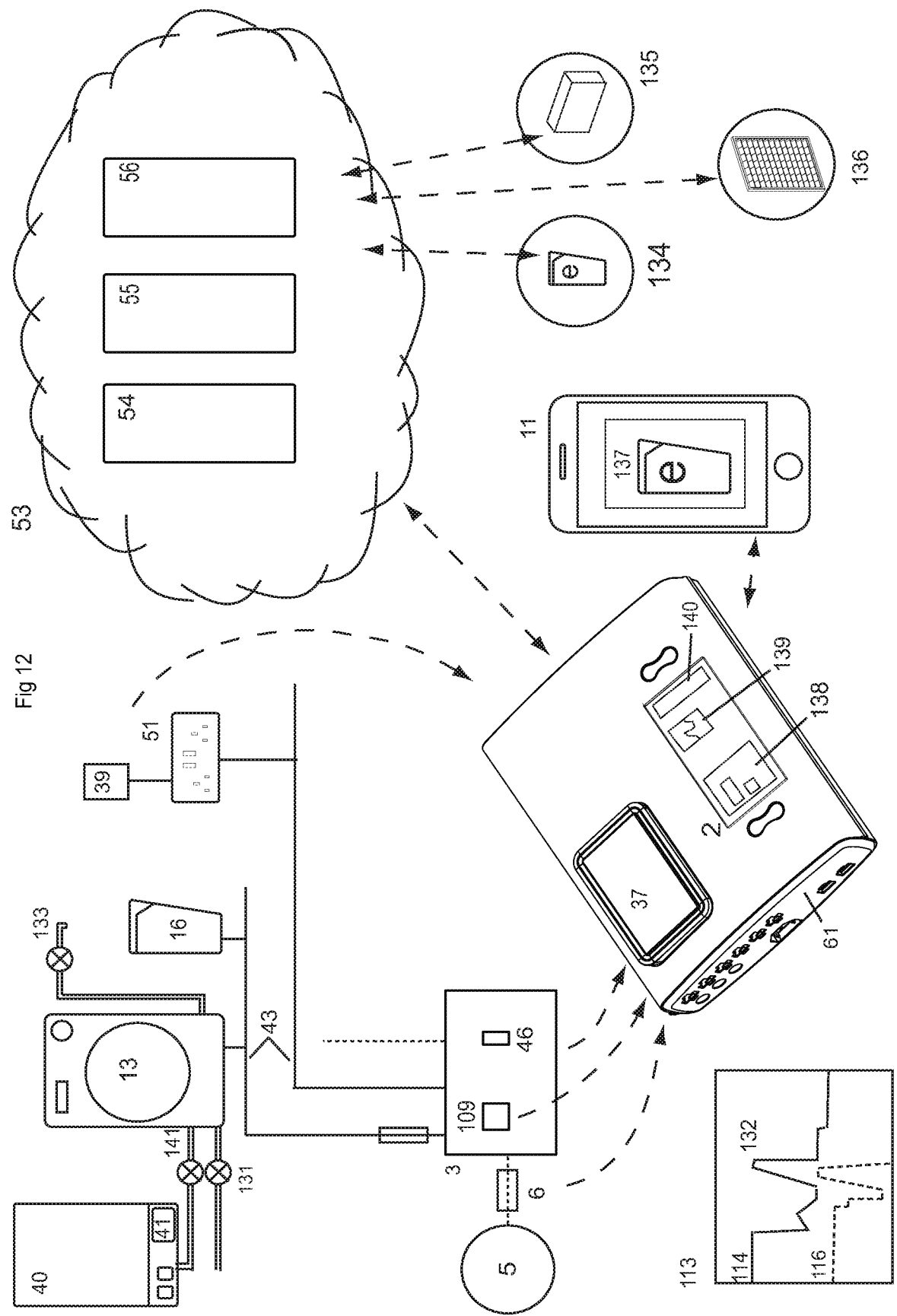

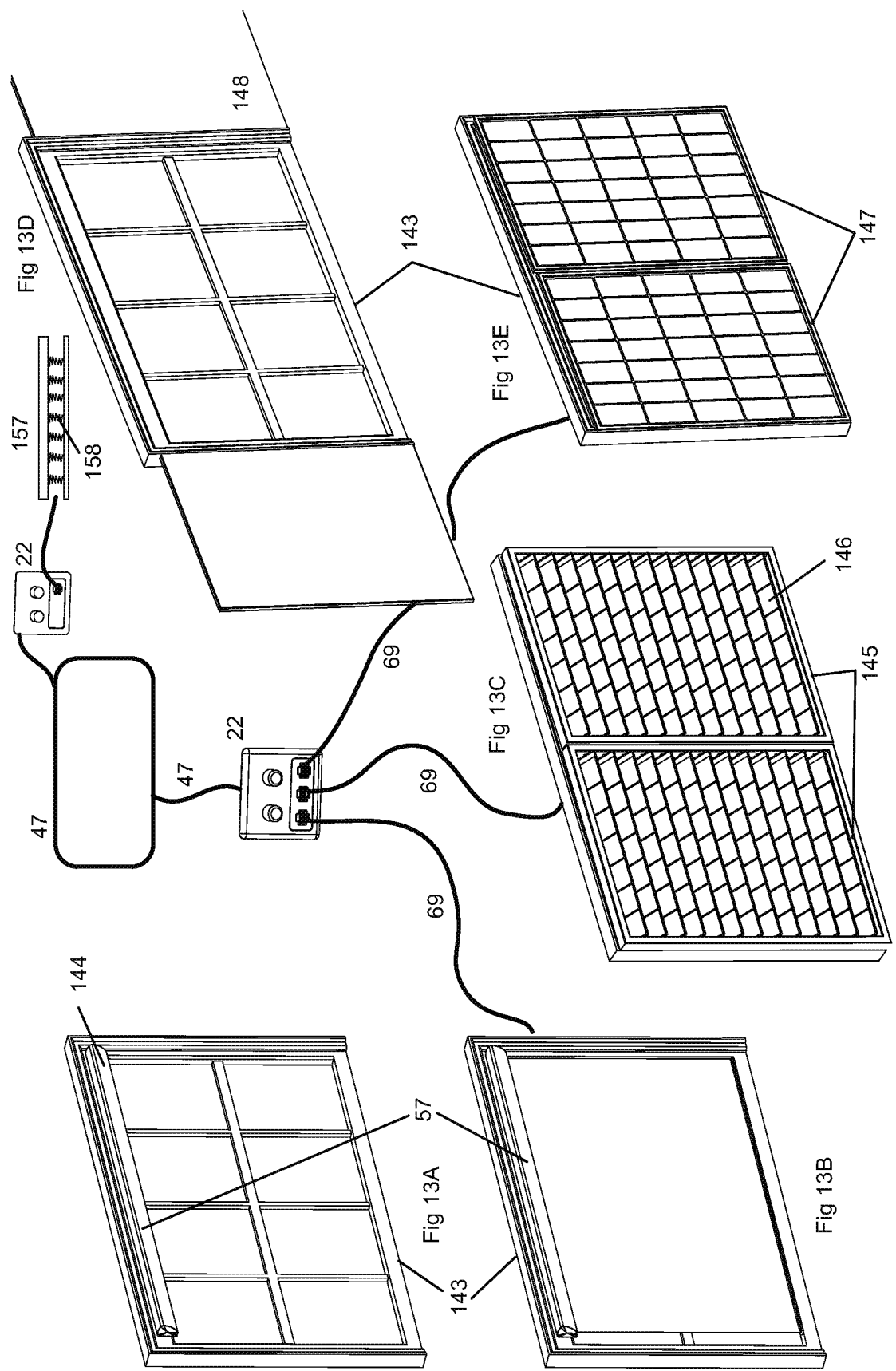

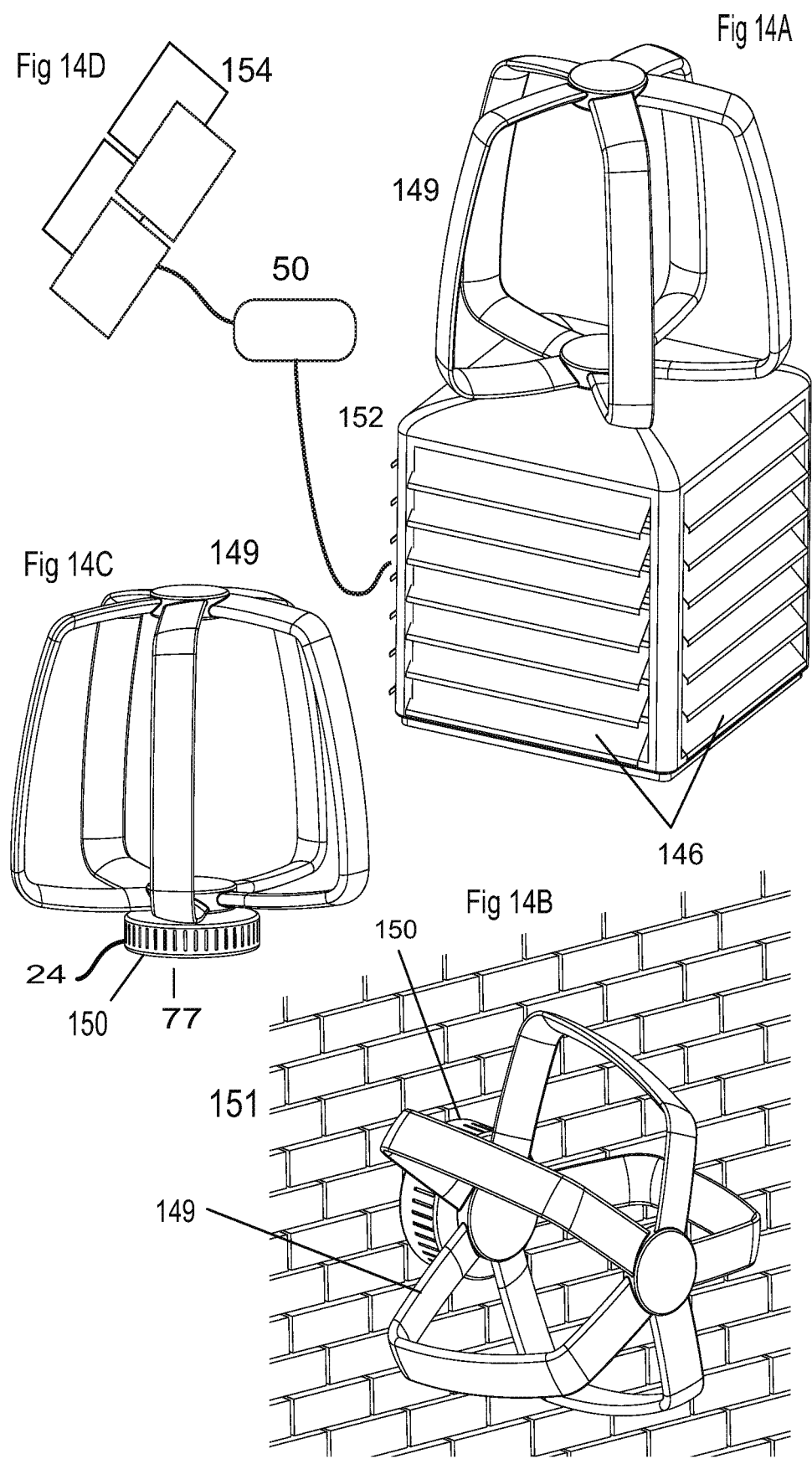

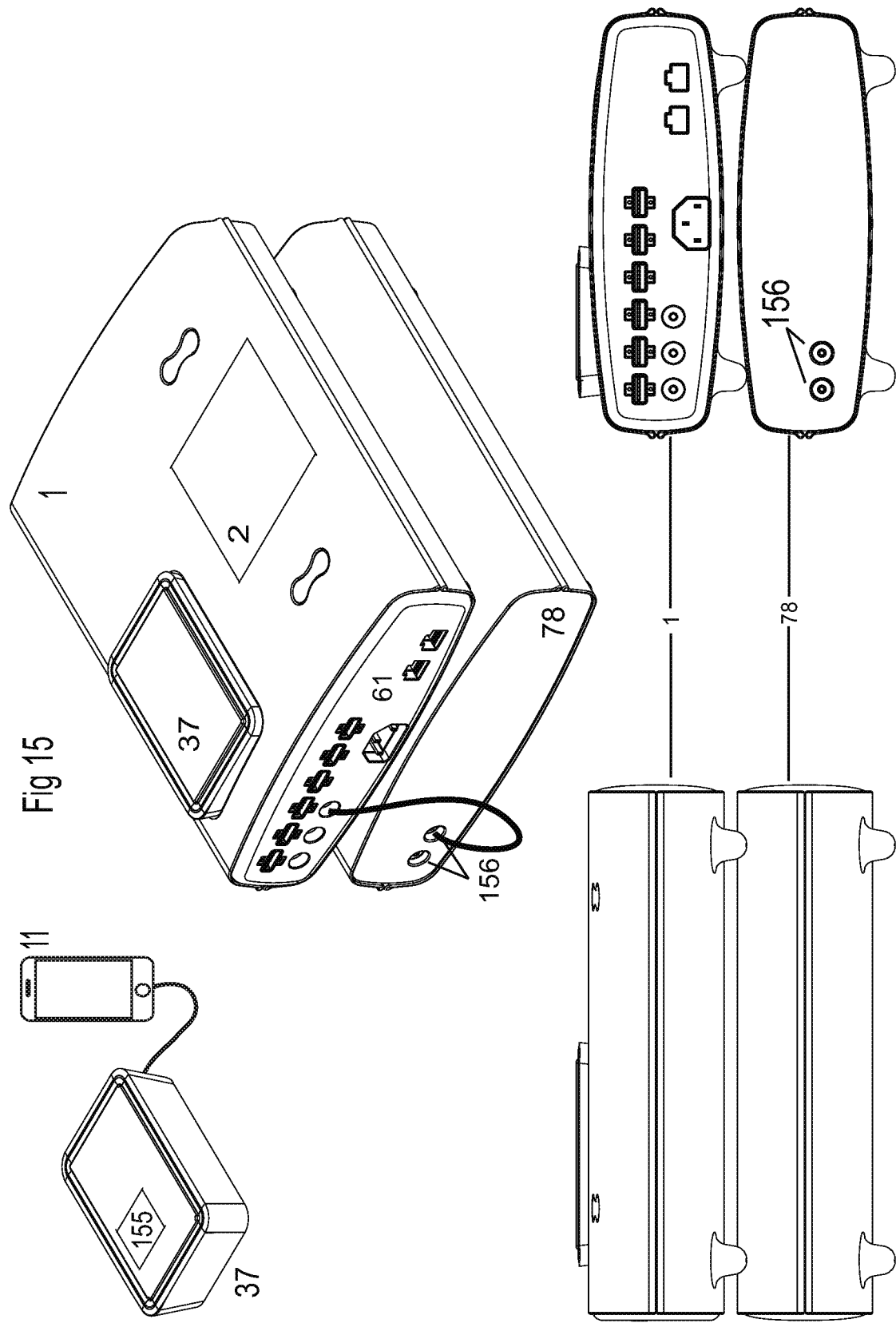

SYSTEMS, DEVICES AND METHODS FOR ELECTRICITY PROVISION, USAGE MONITORING, ANALYSIS, AND ENABLING IMPROVEMENTS IN EFFICIENCY

CROSS REFERENCE TO OTHER APPLICATIONS

This application is a continuation of U.S. patent application Ser. No. 15/250,000, entitled SYSTEMS, DEVICES AND METHODS FOR ELECTRICITY PROVISION, USAGE MONITORING, ANALYSIS, AND ENABLING IMPROVEMENTS IN EFFICIENCY filed Aug. 29, 2016 which is incorporated herein by reference for all purposes, which is a continuation of U.S. patent application Ser. No. 14/489,105, entitled AGGREGATING AND MANAGING RECHARGING OF PORTABLE/EV BATTERIES VIA SOCKETS filed Sep. 17, 2014 which is incorporated herein by reference for all purposes, which is a continuation of U.S. patent application Ser. No. 12/559,192, entitled SYSTEMS, DEVICES AND METHODS FOR ELECTRICITY PROVISION, USAGE MONITORING, ANALYSIS, AND ENABLING IMPROVEMENTS IN EFFICIENCY filed Sep. 14, 2009, now U.S. Pat. No. 8,849,471, which is incorporated herein by reference for all purposes, which claims priority to British Patent Application No. 0816721.5, filed Sep. 13, 2008 which is incorporated herein by reference for all purposes.

FIELD OF THE INVENTION(S)

The present invention relates generally to systems, devices and methods for the efficient use of utilities, more particularly to the distribution and provision of electricity supply at appropriate voltages, monitoring and usage by end devices, and to facilitating consumers in changing their energy usage behaviour, and to adopt and easily install appropriate sustainable, energy efficient or renewable technologies.

BACKGROUND AND SUMMARY OF THE INVENTION(S)

20th Century Electricity power transmission was dominated by the Tesla and Westinghouse system of AC Alternating Current which won over the earlier Edison DC power distribution model, in part as power was generally generated remotely, transmitted efficiently over long distances via AC and at high voltage (to minimize conductor size and power law distribution losses, and HVDC conversion technology was not known then), and used for generally high load end device applications in domestic, office and factory locations via AC 110/240 v power circuitry and sockets, which remain the dominant in buildings today.

However 21st century requirements are changing, in both the production and consumption of energy as well as new environmental and conservation pressures, suggesting a new architecture for power provision and control in buildings.

Today many renewable technologies, localized storage, local distributed generation or home micro-generation/CHP technologies are available or emerging that can provide power closer to end loads, for example some can be placed a few metres away in households so have advantages of reducing distribution loss issues. Similarly they have potential to reduce conversion loss as several technologies, such as storage, solar photo-voltaics produce DC output directly negating the losses from rectifying/inverting to AC if it can be connected directly to suitable end loads. However, significant challenges in physically implementing such renewable solutions (and particularly low cost micro-generators as well as mini generators or energy scavengers providing only small amounts of power) in every day houses and building circuitry remain; such as controlling and connecting into existing building circuitry, designing for easy 'Plug/Play' application in the context of a lack of common voltage or other standards in end devices and supply, or measuring suitable circuit/device load opportunities for intermittent renewable supplies, consumer ease and cost of change, and matching solutions to consumers and usage type and achievable consumer change behaviour, as well as timing and choosing to deploy or retro-fit such solutions cost effectively within the limits of the current technology adequacy level and apply them to the right end applications vs. intermediary up-grade paths or migration points or developing new build approaches as new technology becomes available.

Similarly the modern end load requirement is changing in terms of where and what electricity is used for. Modern electronic devices, particularly consumer and portable electronics, lighting technologies (e.g. LED/OLED) are increasingly low power and DC. They are also proliferating as electronics is embedded into more and more devices such that consumers today have significant number of DC devices, each requiring dedicated cables, AC/DC adaptors to draw power, or internal power converters, or are battery operated with dedicated charger stations or use removable disposable batteries. Frequently devices are inefficiently connected to power supply, as cables, batteries and chargers, adaptors traditionally have a low cost focus and high AC/DC losses, or have poor power control (are frequently left on a power consuming standby mode, or are always on even when not utilized), or are not standardized or capable of tolerating or converting supply voltage differences or using universal adaptors, and consequentially clog up limited AC socket space or cause wiring hazards or portable inconvenience, have high churn as dedicated and obsolete with the device wasting precious natural resources and materials. It is estimated that in excess of 10 billion adaptors are in use worldwide, wasting 2-3% of national electricity in power conversion alone (and further loses with standby inefficiency), and each year over a billion adaptors go into landfill, along with over 15 billion disposable batteries.

This shift towards low power DC is set to continue with proliferation of phone/portable electronic devices, lighting and with devices themselves becoming more energy efficient, particularly as advances in semi-conductor and nano-technology enable ever smaller intelligent or embedded devices, and the centralization of services (see below). The result is that at the household level a majority of devices will be low load DC, yet the problem of connectivity to the legacy grid/domestic AC supply is significant—it is not designed or optimal for an increasingly DC future.

These problems prompt the need, which the present invention provides means to address, for better provision of low power DC supply in building circuitry to co-exist alongside or partially replace AC circuitry—which is still required for traditional legacy high load devices such as cooking/washing/heating appliances, lighting pre migration to more efficient solutions, electric vehicles or highly mechanical/electric motor based devices, and adolescent product categories (many technologies often emerge first as high load but become more efficient on power over decades e.g. TVs from CRT to LCD to OLED, or music from mechanical to digital, lighting from incandescent to CFL to LED/OLED). Said low power provision may include dedicated wiring or wiring re-use, renewables integration, points of efficient AC/DC conversion, sub-loop circuits of localized DC power, DC power servers or sockets and suitable control, variable voltage capability and storage means.

Some of these problems have previously led to using alternate dedicated wiring, such as the legacy phone network, Ethernet to act as a low power source commonly referred to as 'PoE—Power over Ethernet' around a 48 v supply level, and other standards such as the Universal Serial Port—USB, however, such approaches have generally required dedicated wiring, cable length restrictions and load limits (e.g. PoE 12-15 W, USB 0.5-2.5 W/4 m) however, they play a role in the overall architecture for power provision of the present invention given the universal benefit of end connectors such as Ethernet and USB for end socket loads, as do similar classes of power connector adaptors (typically found on 9V AC/DC adaptors for computers, or 3-5 v adaptors for mobile phones).

Whilst such proposals of power over Ethernet or USB protocol for power provision have largely focused on selected devices and not on how such systems could be aligned against AC circuits, particularly domestic circuits, or to incorporate renewables and a wide range of end devices with different voltage requirements.

Another factor in power provision is the changing trends in where energy is consumed or devices are charged. Many low power devices are portable, so a small but increasing proportion of a consumers energy e.g. laptops/phones, is now 'carried' and relies on wasteful disposable batteries or re-charging at different locations—which has already resulted in one company (a budget airline) banning staff from charging personal mobile phones in offices as passing costs to the employer. Electric vehicle storage batteries may charge from dedicated stations, or swap over batteries at charge banks, or overnight charging at homes (when power is cheaper or when directed to be charged by intelligent vehicle to grid V2G or smart grid load balancing systems), and may also have the capability (supported by the present invention) to provide power back to the home for suitable DC/low load applications, or as per prior art (e.g. Google/Gridpoint vehicle/direct response systems) to provide power back to the grid under 'direct response' systems that also seek to balance peak energy requirements by turning off systems (e.g. HVAC) that have been pre-allocated as low priority to prevent the need to have built additional network generation capacity for peaks. Similar Fuel cell/hybrid cars may also act to provide power into homes or smart grid systems, and smaller scale fuel cells in CHP systems or as portable fuel cells may also have the ability to act as charging stations or provide supply into circuitry.

A further relevant trend is an overall virtualization of products and services, and a centralization of data and application provision in data centres or the wider network under cloud computing. As a result power consumption in data centres is growing significantly (e.g. exceeded 1.5% of total US consumption in 2006), along with power required to support constant 24×7 uptime and access at high bandwidth across physical and mobile networks. On one level this shifts energy consumption more centrally from homes/offices to central locations as end computing devices become 'thin clients' both in processing/storage as well as in energy requirements however, this is partly balanced by the trend to leave computers as well as broadband and wireless routers on constantly. This trend reflects consumers increasingly outsourcing activities to the network—such as memory or basic organization (mapping information, diary/contact details, basic information/search) and services which may not always have positive energy reduction trade-offs, even though the present invention discloses capabilities to similarly enable energy management to be outsourced to third parties and web services to drive efficiency gains. A similar transition and trade-off has occurred in product virtualization and moving to solid state devices, such as in music apparatus, where current low power music devices such as MP3 (e.g. 160 m+ iPod devices), are significantly energy and materials efficient compared to the electric motor and oil (DVD/CD/Vinyl/Tape) based music apparatus of the past, so arguably shifts power use from the home to data centres supporting libraries of downloadable content—but has the overall result of dramatically reducing the world wide energy and resource requirement that would have previously been required to service 160 m+ consumers worth of music consumption. Similar trends are likely across other technology categories, which may further shrink some domestic energy requirements and shift into data centres—which are themselves significantly investing in how to best maximize DC power provision to server racks, and also optimized co-location with renewable supplies or centralized power generation.

Such Data Centre investments and new DC distribution architectures and power conversion circuitry can also, according to the present invention, translate back to distributed generation technologies at the local and street level to provide optimized AC/step down, and DC distribution in neighbourhoods direct to houses/residential units for suitable loads, since an average data centre server rack cabinet now consumes many multiples of the average European household electricity load. Consequentially each server rack can be viewed loosely as equivalent to several houses, and several terraced streets or tower blocks as equivalent to a row of server racks. Knowledge of DC load requirements, circuit taxonomy and device type and usage, according to the present invention, provide mechanisms to optimize and determine the viability of local distributed generation capacity and DC provision for supplying distributed loads across houses (e.g. thin-computing, network access, media devices, LED lighting) as well as direct response/control/balancing opportunities in overall energy management.

A key challenge to renewable integration is the trade-off and cost-benefit calculation on whether implantation makes sense, particularly with the current efficiency and cost level of certain technologies. Whilst remote power generation, such as coal might be 60% inefficient, with approx 5% further lost in transmission, installing local micro-generation (such as solar) to enable all devices to be powered off-grid in homes, is frequently wrong on cost-benefit, due to the high cost of generating capacity to cope with peak loads, the intermittent nature of solar, and the overall loss when inverting up to AC. In fact it rarely makes sense except for lower load DC application, where such loads should be identified and powered directly as per the present invention, without a necessity to convert to AC and down to DC again, and where such renewable implementations should be sized up to only the appropriate load levels where they make sense. Similarly some renewable, localized storage/V2G systems may make sense in a supporting role for high load domestic requirements or as overall local generation, but might be ruled out on efficiency and cost terms compared to higher efficiencies at higher outputs available in some traditional centralized power systems.

Whilst some intelligent systems for energy management have been proposed (e.g. Gridpoint), or. those involved in direct response management, most focus has been on remotely controlling and shutting down these resources to free up available capacity for elsewhere on the network, rather than attempts to reduce or remove such loads from the system or migrate them to appropriate DC supply or renewable sources.

Key to assessing and determining which technologies and distribution architecture to employ, is measuring precise information on energy usage, patterns of behaviour and circuit, device power requirements and usage, to enable an optimal balance between remote grid based power, local distributed generation and microgen supply and intelligent DC provision in circuitry. More particularly, detailed measurement of how and what AC or high loads are used, enables opportunities to provide advice, substitution or intelligent control to reduce their overall energy use.

Steps have been taken towards better measurement at the household level via Smart Metres or AMI—Advance Metering Infrastructure, where communication is embedded into a utility metre to measure/report usage at higher granularity back to the utility supplier to provide progressively, communication to supplier systems, Automatic meter reading (AMR), more accurate/granular electronic billing as well as ROC/REC environmental claims on energy savings, fault or service analysis, time based tariffs, two-way communication—e.g. facilitating some direct response activity, or direct control (e.g. staged restarts following outages). Such communication has employed numerous forms of communication from proximity touch or RF technology via hand-helds or drive by mobile systems, powerline via sending signals over the power infrastructure to base stations, or fixed network via antennas, collectors or repeaters (including mesh networks where metres themselves act as repeaters— typically via wireless protocols such as Zigbee, or mobile phone networks).

Systems also exist to provide such overall usage data back to consumers in intervals or real-time, either by local displays connected directly via powerline or local communication means to the meter, or via web access and live data updates from real-time monitoring by the energy supplier (GE example), but more typically through independent devices generally comprising of a current sensor attached onto mains cables from the utility metre (e.g. Sentec GB0207383.1), a local communication means and a consumer device/display, set-top box or computer, where usage data is typically shown in an estimated energy cost, unit cost, or environmental measure (e.g. estimated CO2 emissions). Some devices capture/store information enabling comparison or provide a live or batch link to a computer resource to enable more analysis. Few provide information other than crudely, or in aggregate on how the energy is being consumed, however the portable nature of many displays does enable consumers to walk around and see the impact of turning/on or off some appliances to see the corresponding change in real-time energy use, that supports education/ awareness benefits to consumers. Other systems rely on sensors in each circuit or switch (e.g. Deep Stream), adaptors/plugs, that can capture the usage of the device connected to the plug, or high cost systems involving multiple sensors in sockets/devices and appliances communicating via wireless protocols, powerline or other means. However, the present invention provides improvements in monitoring and sensor architecture, benefits of segmenting and leveraging selective sensors—e.g. embedded in individual or primary circuit breakers (RCD/MCB) at the fuse box level, analysis and disaggregation of load, device inference, software monitoring, phase interference, calibration, and other means in combination, or with correlation with other utility usage measurement. The present invention provides measures to recognize and overcome different consumer change psychology that has prevented past renewable installations and energy changes being effective in real situations.

Despite the substantial and numerous prior art and abundance of individual power technologies, renewable technologies and sensing apparatus, few address the problems outlined here or provide the benefits of an overall integrated approach to providing hybrid AC/DC, and variable voltage and end point conversion, ease of installation into an established environment and inclusion of micro and suitable renewables, and overall sensing apparatus, inference and deductions said architecture and systems allow to enable change and savings.

SUMMARY OF THE INVENTION(S)

According to aspects of the present invention, there is provided systems, devices and methods for the efficient use of utilities, more particularly to the distribution and provision of electricity supply at appropriate voltages, monitoring and usage by end devices, and to facilitating consumers in changing their energy usage behaviour, and to adopt and easily install appropriate sustainable, energy efficient or renewable technologies.

Said end devices include traditional electric or electronic appliances requiring AC and DC power provision. Many appliances—e.g. portable devices, consumer electronics and emerging LED/OLED lighting, require low load or low voltage DC power and as such require dedicated AC/DC converters to connect to traditional supplies. In accordance with aspects of the present invention there is provided an Energy Environment (EE) where building fuse boxes (consumer units), wiring/power circuitry, sockets and switches, may selectively include; more efficient AC/DC power conversion, sensing apparatus, sub circuits of localized DC power networks, DC power servers or sockets, and capability to provide variable or appropriate voltage levels to sub circuits or said end devices or in combination with intelligent plugs or micro adaptors for a specific voltage, and means to simplify the installation and control of such components and said devices within the energy environment, and means of integrating appropriate alternate forms of said electricity provision such as micro-generation, local energy storage (e.g. vehicle batteries) or neighbourhood renewable supply and to enable their control and connection to suitable end loads within in the energy environment.

Said energy usage, in accordance to further aspects of the present invention forming an Energy Monitoring Environment (EME) being measurable by software means, via communication with said DC power servers/converters or by said sensing apparatus that may selectively attach or embed sensors, circuitry and communication in utility metres or overall fuse box level, or in circuit breakers, RCD's (residual current devices), switches, sockets, storage, fuses, plugs or end devices, to provide real time energy data at the overall load, circuit level or appliance/device level; or through signal processing or algorithmic means disaggregate a measured overall or circuit level loads for current and phase change analysis to enable appliance inference and device usage monitoring, routine and unusual or new behaviour, fault detection, and overall wiring circuit topography inference mapping and load distribution. Where said analysis may for example infer individual devices by measuring current load/magnitude or identifying unique power signatures or profiles as types of appliances turn on/off or are in use, or where segmented within a circuit level measurement, or by comparison against an established database, learned behaviour, consumer interview or peer group comparison, or via a trained neural network algorithmic model, or convolution of a simulated model and comparison. Where said analysis may optionally be further calibrated to provide a higher monitoring and detection accuracy resolution via measuring reference devices on the circuits, or with reference to periodically placing AC or other signals onto the power circuits within the Energy Environment (e.g. where a high frequency AC signal is placed and phased in a manner as to be measurable, interfere or suffer interference with certain load spikes or characteristics of end devices)

Said data on energy, appliance and device usage being useful to facilitate efficiency gains in accordance with further aspects of the present invention providing an Energy Change Environment (ECE), for example through; effective information display and pricing—and provision of dynamic or selective control means or advice on outputs such as computer software or web pages, TV set-top box outputs or remotes, portable displays, mobile phones or utility statements; as well as communication and reporting to stakeholders or implementing billing variations; psychological profiling/scoring of such energy and device use optionally aided by surveys to enable a consumer or household energy usage or change Type to be determined; learning behaviour of routine and unusual use patterns to generate advice and recommendations (e.g. hot water/heating/lighting adjustment times), or savings illustrations based on peer comparison and scoring; intelligent control opportunities to switch off or minimize wasted uptime, or dynamically control integrating renewable or storage supplies at the appropriate circuit and device level; reporting and tracking savings impact (for example to enable ROC/REC environmental credits). Said appliance/device level use and contextual behaviour data enables precise targeting or brokering to third-party sponsors or stakeholders of appropriate advice, adverts or cross sell product opportunities as well as algorithmic modelling of the benefit case, for example over further intelligent control devices or DC power server applications, LED/OLED solutions, kitchen appliances, outsourced services, or advice on product substitution (e.g. for washing appliances enabling a cross sell of a lower temperature washing powder based on usage observation). Where said recommendations may also be scored and profiled based on their take-up and actual measured energy savings impact in real world situations by consumers, together with Peer group commentary and feedback, and thereby selectively made available to consumers or through a green search tool. Said overall usage data and circuitry knowledge also enabling identification of prospects for retro-fitting, future fitting, or migration paths for renewable installations (and workflow/model of potential installation cost and complexity) for changing and improving the Energy Environment such as through migrating entire circuits at the central fuse box level, or room loops to low power DC supply and devices, localizing Plug/Play micro-generation opportunities, or integrating suitable energy efficient products and solutions.

In accordance with preferred aspects of the invention, the combination of the Energy Environment EE, Energy Monitoring Environment EME, Energy Change Environment ECE and interaction between said parts, act to provide real-time measurements, advice and education, advertisements and recommendations, dynamic control and actions, to directly reduce energy use or enable migration towards a more efficient use of energy, and include preferred elements such as a Home Energy Server (HES), Zone Energy Module(s) (ZEM), Light Switch Socket Unit(s) (LSSU), Local Renewable Supply (LRS), wiring circuitry, end devices, sensor apparatus, consumer display(s), local and remote communications and Remote Server Resources.

Where said circuitry in preferred embodiments may then be split into a hybrid AC/DC circuit network by placing power control devices such as the Home Energy Server (HES), Zone Energy Module(s) (ZEM), Light Switch Socket Unit(s) (LSSU), Local Renewable Supplies (LRS) at appropriate stages on the circuits between a fuse box and sensing apparatus and end devices, depending on the overall load usage and downstream power requirements of circuits and end devices. Where said DC sub-circuits support a variable DC voltage and are preferably mediated and monitored by a Home Energy Server (HES) which may selectively via a Power Control Module incorporate supply from efficient mains AC/DC power conversion, local renewable sources or Storage means directly or at points on the circuits, and may vary the overall voltage and load on the circuit depending on the end load requirements (and also preferably provide appropriate power to a plurality of connectors), and where a plurality of further power modules such as Light Switch Socket Units, Zone Energy Modules, or certain end devices are installed on the variable voltage DC circuit and are tolerant to said variable DC voltage input, and are themselves capable of an internal power conversion to provide further downstream end devices with an appropriate required voltage and current. Wherein said overall variable voltage and load may be preferably minimized within the overall Energy Environment by means of the Energy Monitoring Environment establishing a pattern and expected requirements.

Where in a preferred embodiment said internal power conversion is achieved by means of a power delivery control module, capable of receiving a variable voltage input, communications, and providing an appropriate output voltage and current to connector sockets capable of accepting standard connectors or providing a voltage and current dependent on parameters of an external intelli-plug. Where said socket in a preferred embodiment is a hybrid socket that can mechanically accept a standard connector (such as preferably as USB 2.0 or USB 3.0 plug), whilst at the same time also have the ability to support an alternate plug referred in this description to as an intelli-plug, having an alternate form such as a cross shaped plug supporting a central horizontal connector with the same dimensions as a USB plug, and additional vertical prongs and pins (that would prevent connecting this to a USB socket). Where said intelli-plug preferably supports resistors with specific values between data pins corresponding to USB 3.0 data pins, that can be detected as parameters by said power delivery control module socket in order to enable the power delivery control module to provide the requested voltage and current through the socket to the intelli-plug.

Where in a preferred embodiment said power device ZEM is capable of receiving and converting an AC mains supply, and said ZEM and LSSU devices support a plurality of said connector sockets, and said devices are capable of incorporating an intermittent local renewable or storage supply directly or via said connector sockets, and providing said connectors with a standard voltage for standard external connectors (being a USB 2.0, or USB 3.0 in a preferred configuration) or a specific voltage and current requested by means of the resistor parameters in a connected intelli-plug.

Where in a preferred embodiment said LSSU can preferably re-use existing lighting circuit wiring and Light switch panels that have been disconnected from the original AC supply or fuse box circuit, and now receive a variable voltage DC supply mediated by a HES device, and said LSSU are capable of adaptation by interchanging a Light Switch Socket Module (LSSM) on the face panel, where in preferred embodiments said LSSM may include a plurality of said intelli-plug sockets, or alternate sockets such as a regular USB, or Ethernet socket when combined with communications (such as wireless, Zigbee or Powerline by example), or a round 9 v or other voltage round pin connector, or may selectively include a display, lighting control switches, or inverter apparatus, and in preferred embodiments of the overall Energy Environment receiving nearby input connections from local renewable micro or mini generators. Where said generators are in preferred embodiments plug and play devices that can be easily installed.

Where in a preferred embodiment said Zone Energy Module may be combined with LSSU modules to enable a room or zone to be disconnected from an AC supply and connected to a variable voltage DC supply, and power a range of end devices. Where in an example embodiment this may be applied to a bathroom where the ZEM may be combined with a ceiling speaker and light unit, lighting and an extractor fan unit, together with a LSSU control and sockets for additional devices, and to a shaver point.

Where in preferred embodiments of said overall Energy Monitoring Environment the sensing apparatus comprises at least one overall load sensor at the fuse box or smart metre level, and at least one Circuit breaker supporting an embedded sensor capable of measuring and communicating the real-time current through the circuit, and said Home Energy Server supports communication and software means of developing databases of information and comparing such signals and identifying by various alternate local or remote analysis means, infer end appliances and devices, and to use said inference to provide dynamic feedback into adjusting or optimizing parts of the variable voltage network and devices, or to provide advice and cross sell opportunities. Where in a further preferred embodiment said inference may be aided with said circuit breaker sensor placing a reference AC signal onto the circuit or via a calibrator unit elsewhere on the network, in order to create a measurable phase, noise interference or other measurable current change to facilitate device identification.

Where in preferred embodiments cross sell opportunities for advice and products, may include recommending further changes to the Energy Environment or provision of renewable supplies, or substitution of end devices for more efficient products, or recommendations by means of displays and comparisons, or suitable alternate products (e.g. for example energy efficient cooking apparatus, lower temperature washing powders, low energy light bulbs, boiler controls, additional sensors, insulation, etc)

Where in further features of the present invention various preferred embodiments of solar, wind, piezo/thermal electric generator devices may be selectively included into the Energy Environment, which may for example include simple plug an play mechanisms to install solar devices around a window frame, such as a solar film rollable blind, that may preferably be deployable under automated controls, or forms of Venetian blind that can be physically attached to the inner or outer window frames and supporting solar film or solar panel strips, or where said shutter frames can support traditional solar panels, or methods of incorporating solar tiles onto a wall or roof, or where wind renewable generators may be connected to walls, roofs, or external extractor fan vents on walls or roofs, or to air conditioning/HVAC units, providing supplementary power for such units or intermittent power onto said variable voltage DC circuits via LSSU or ZEM modules or to a central building renewable controllers.

Whist preferred embodiments of the inventions have been described with pre-dominant reference to the provision and management of electricity, it should be appreciated that aspect of the Energy Environment, Measurement Environment and Change Environment can be applied to the efficient provision and supply of other utilities, for example to gas or water provision, usage monitoring to enable education and advice, cross-selling, efficiency or conservation choices and solutions. In particular aspects of the sensing apparatus, and inference methods could apply to measuring resource loads, and time usage patterns, to enable individual devices on a water distribution circuit (household pipes), to be measured and identified—e.g. taps, sinks, showers, bath-tubs, toilets, washing machines and dish washers, based on measurement of flow, identifying pressure change or quantized usages of water, frequency and time of use, wasteful use or faults, and identify behaviour patterns and opportunities for improvement.

Data usage analysis also being useful to feedback to consumers or used in conjunction with overall electricity use data to enable better customer profiling and change opportunities, for example to provide dynamic control or automatic scheduling of hot-water and heating elements, or provide correlating data to calibrate or validate electricity inference of end device usage such electric shower, washing machine and dish-washers, to enable said energy loads to be removed from an overall electricity load measurement to enable greater resolution in identifying lower energy loads, or reported to customers in displays that identify and communicate the essential elements corresponding to their overall utility bills for electricity, gas and water use.

Similarly scheduling aspects concerning intelligent triggering of boilers, heating, and washing devices may be optimized from observing and measuring overall behaviour, or from direct correlations—such as time between an alarm clock dynamic trigger, light on event and need for heat or hot water, or before accessing computing equipment (e.g. enabling opportunities to say automate booting a computer, broadband router at the point of expected need). Other aspects of the overall measurement environment through combining multiple utility knowledge can enable entire patterns of behaviour—for example waking, washing showering vs. bathing, cooking, departure or home activities, to be analysed through water, gas, electricity consumption patterns, with inference identification of devices in use, and potentially products, to enable usage of said data for advice or brokering of said data to third parties for related cross promotion or product offers (e.g. to third parties cost offsetting to substitute more efficient products and services).

Similarly present invention aspects over integration of local renewable sources can apply to water system and particularly hot water distribution, since heat exchangers, thermo-electric or other means could be connected to convert excess heat into electricity for supply into DC circuit loops or storage devices. Said waste heat gathering opportunities also exist by identifying unused water potential, boiler storage tanks or from direct scavenging of cooking apparatus from either general usage monitoring, or direct communication from control devices over boilers, electrical or gas based cooking apparatus in homes. Solar renewable devices may also be integrated into an Energy environment, such as solar thermal tubes or external 'Venetian style' shutters according to the present invention contain a thermal tube loop for warming water supply into a storage tank or immersion heater providing an aesthetic renewable installation close to a potential application.

According to an aspect of the present invention there is provided a method of installing a energy management and power provisioning system as described above to form an Energy Environment (EE), comprising using existing household power circuitry wiring by disconnecting circuits (such as lighting circuits) from an AC mains supply or consumer unit (fuse box) and connecting said circuits to a power control device such as a Home Energy Server (HES) or Zone Energy Module (ZEM), to provide a DC sub-circuit, and to replace at least some of existing household light switch units with Light Switch Socket Units (LSSU) to provide local DC connector sockets, and to replace light sockets with low power DC lighting such as LED or OLED lights.

According to an aspect of the present invention, there is provided a solar photo-voltaic local renewable supply (LRS) arranged to be capable of being installed in or on the outside of a window or window frame, and provide a DC power supply to a power control device (such as a Light Switch Socket Unit (LSSU), Home Energy Server (HES) or Zone Energy Module (ZEM)) or to a battery storage unit, or other end devices.

The solar photo-voltaic unit may comprises photo-voltaic material and electronic circuitry and being one of; a flexible solar film and forming an overall roll-a-blind or roman blind assembly for mounting inside a window frame; a slatted venetian blind shutter structure for mounting on the inside or outside of a window frame, and optionally supporting swivel mechanisms to enable slats to rotate to an optimal placement and hinging or sliding mechanisms to enable the shutters to be opened; a shutter that acts as a vertical or horizontal sun shield when mounted adjacent to the window; a solid panel mounted or hung from a window frame at a suitable angle; where said forms may optionally support biasing or deployment means to optimize angles for capturing solar energy or for automated deployment when rooms are not in use.

According to an aspect of the present invention, there is provided software means and methods for primary components of said energy management and power provisioning system, or computing apparatus or remote server resources for supporting the analysis, device inference, communication, control, reporting, display, maintenance and upgrading, of instances of energy management and power provisioning systems as described above, in a plurality of locations, homes and offices.

The electronic circuitry and schemas for an energy management and power provisioning system may be as described in the application herein and illustrated in the accompanying drawings, including selectively: electronic circuitry for communication, power management, aggregating and integrating different power supplies, controlling and mediating a variable DC network, power delivery module circuitry for receiving a variable voltage input and providing an appropriate output voltage and current dependent on parameters, circuitry to determine said parameters where resistors are placed between data-pins within a connector format, embedded sensor circuitry for monitoring voltage, current and phase characteristics within a circuit breaker, or providing an AC interference signal.

According to an aspect of the present invention, there is provided a wind powered local renewable supply (LRS) capable of being mounted on a wall, window, roof or vent structure, and being formed selectively as a; transparent apparatus; fixable to a extractor fan or bathroom vent; extractor fan and wind power device.

BRIEF DESCRIPTION OF THE DRAWINGS

The accompanying drawings illustrate presently preferred embodiments of the present invention and together with the detailed description serve to explain the principles of the present invention.

FIGS. 4A-4C show an example Home Energy Server (HES) in 3D (FIG. 4A), sides (FIG. 4B) and Plan view (FIG. 4C), including a plurality of input/output connections, removable portable charger unit and display.

FIG. 5 shows an example Power Control Module for a Home Energy Server HES (or Zone Energy Module—ZEM) capable of receiving an AC or DC wiring input or from a LRS, a storage device, and capable of mediating and providing a variable output voltage to a series of connectors or DC power circuit loop.

FIGS. 6A-6C show an example Zone Energy Module hub in plan (FIG. 6B), side view (FIG. 6C) and 3D view (FIG. 6A) capable of receiving an AC mains, or DC input from a Home Energy Server, or renewable source and providing output voltages to a series of end devices, including a Light Switch Socket Unit.

FIG. 7 shows an example installation of a Zone Energy Module in combination with an example ceiling light/speaker unit, lighting, and extractor/wall unit, and indicative thermo-electric renewable supply.

FIGS. 8A-8E show an example variable voltage Light Switch Socket Unit (in 3D FIG. 8A, face view FIG. 8B and side view FIG. 8C) together with example Light Socket Modules supporting sockets for connecting a voltage selector intelli-plug (FIG. 8D) or standard format connector (FIG. 8E).

FIG. 10A shows an indicative real-time measurement for usage and appliance inference analysis. FIG. 10B shows an example sensor arrangement within a Energy Monitoring Environment, comprising an overall system load sensor and at least one Sub-circuit load sensor (in this example embedded in a RCD, MCD unit). FIG. 10C shows an example MCD circuit sensor (CBS), and FIG. 10D shows an example RCD sensor.

FIG. 11A shows indicative circuit schematics for communicating Circuit Breaker Sensors capable of self power by energy scavenging, communicating, measuring a load or placing a reference signal onto the circuit, and FIG. 11B shows an indicative embedding of said circuitry inside or within the side panels of an indicative circuit breaker.

FIG. 12 shows an indicative combination of the Energy Monitoring Environment via the Home Energy Server element of the Energy Environment involved in enabling the Energy Change Environment to communicate a third-party recommendation to a Customer Display, relating to usage of Kitchen apparatus.

FIGS. 13A-13E show indicated examples of solar based Local Renewable Supplies capable of being installed in or on the outside of a window or window frame, and connected to a Light Socket Module or ZEM, along with an example mechanical or potential energy micro generator. FIG. 13A shows an example solar blind in a storage position, and FIG. 13B said solar blind deployed, FIG. 13C shows an example solar 'Venetian blind style' window shutter, FIG. 13D shows an alternate shutter open, and FIG. 13E a more traditional solar panel attached to a window.

FIGS. 14A-14D show indicated examples of wind based Local Renewable Supplies capable of being installed on a wall or roof and connected to a ZEM or house renewable controller, FIG. 14A shows an example hybrid solar/wind/storage cell, FIG. 14C shows an example wind micro generator, FIG. 14B shows said wind device attached to a wall, and FIG. 14D example solar tiles.

FIG. 15 shows an example stacking of a modular HES casing with a storage unit, and a removable Portable Charge Unit shown to be charging an example portable end device.

DETAILED DESCRIPTIONS AND PREFERRED EMBODIMENTS

Figure 1:
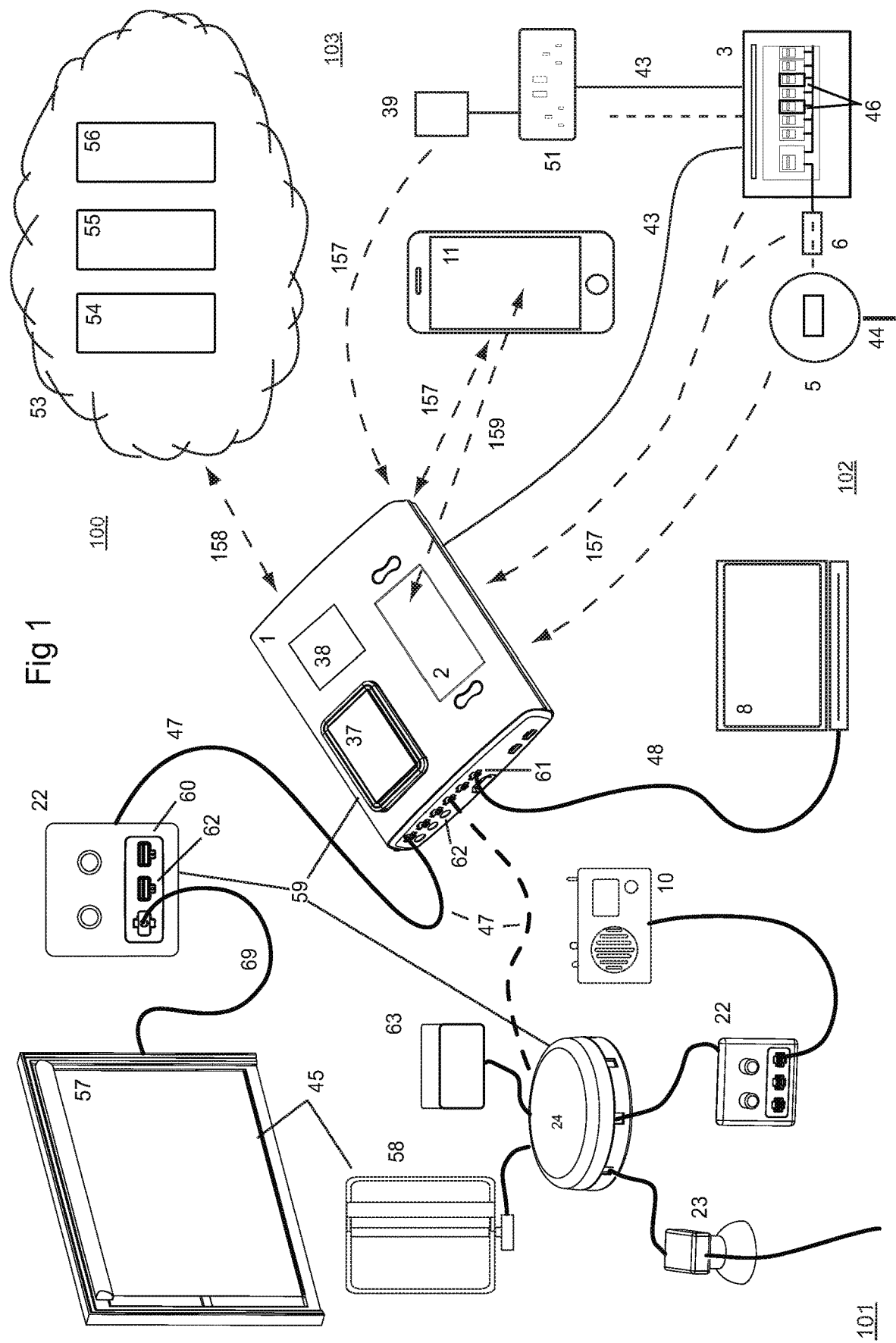
FIG. 1 illustrates a high level schematic of elements of the "Energy Environment" (EE), "Energy Monitoring Environment" (EME) and "Energy Change Environment" (ECE) provided in accordance with a preferred example/embodiment if this invention, included a Home Energy Server (HES), Zone Energy Module (ZEM), Light Switch Socket Unit (LSSU), Local Renewable Supply (LRS), wiring circuitry, end devices, consumer display, local and remote communications and Remote Server Resources.

Preferred embodiments of the invention will now be described in detail with reference to the accompanying drawings herein:

Referring to FIG. 1 which shows a high level schematic of elements of the Energy Environment (EE) 100 configured as a Home Energy Environment (HEE) 101, Energy Monitoring Environment (EME) 102 and Energy Change Environment (ECE) 103, where said HEE 101 includes power devices 59 such as a Home Energy Server (HES) 1 for efficient AC/DC provision from a mains supply 44 or from integration of a local renewable 45, or a Zone Energy Module (ZEM) 24, or Light Switch Socket Units (LSSU) 22 with integral Lighting Switch Modules (LSM) 60 which is shown in receiving an input from a local renewable source 45 being a deployed Solar Blind 57 in this example. Where the HES 1 is shown supporting a Portable Charger Unit (PCU) 37, a Display 2 and containing communication means, usage analysing software 170 and power control module 38 and physically connecting via side-panels 61 and plurality of sockets 62 to cables 48 powering end devices (e.g. a Laptop 8 in this example), and circuit wires 47 to a LSSU 22 and Zone Energy Module 24; and said HES 1 is shown communicating wirelessly 157 or by other means to utility metres 5 and sensors 6 connected to fuse box 3 with embedded Circuit Breaker Sensors 46, or to calibrating devices 39 within the Energy Monitoring Environment 102; and exchanging usage information via networks 158 to remote resources 53 such as a remote server resources or databases 54, utility systems 55 or third party recommendation systems 56 to show information, feedback or advice via local consumer displays 159 being a mobile phone 11 in this case, or to a HES 1 display 2 within the Energy Change Environment 103. Where said Zone Energy Module 24 is illustrated as connected to low energy lighting 23, further LSSU's 22 powering in this case example low power DC devices such as a digital radio 10, or other general devices 63 or to supplement with power contribution from a local mini-generator wind device 58.

Figure 2:
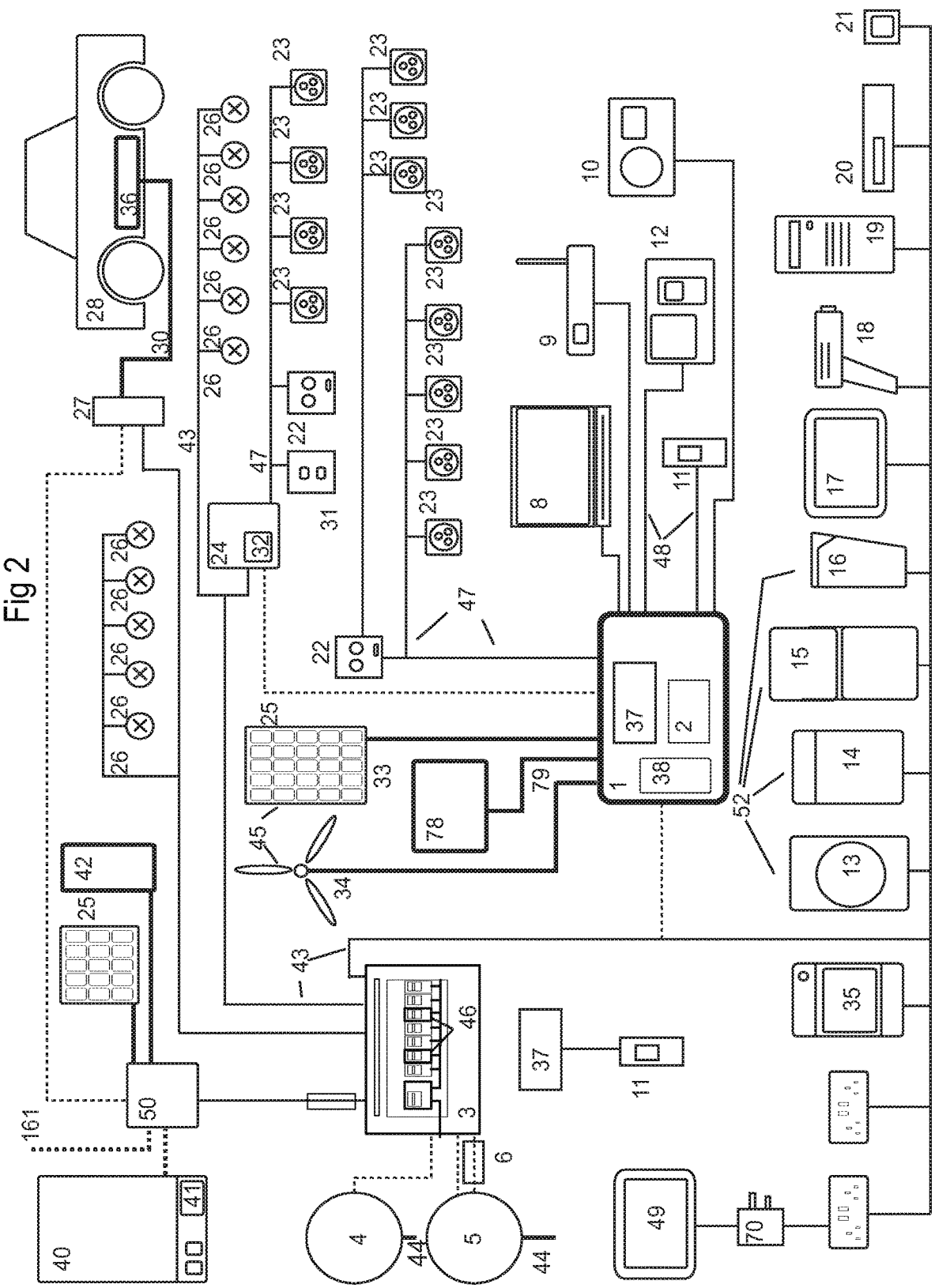
FIG. 2 shows a more detailed schematic of a Home Energy Server (HES) integrated within an indicative Home—Energy Environment (HEE) building wiring comprising a renewable or AC mains supply, sensors, various AC or DC sub-circuits and various ZEM, LSSU, LRS convertor, control or supply elements together with end AC and DC devices.

Referring now to FIG. 2 which shows a more detailed schematic of a Home Energy Server (HES) 1 integrated within an indicative Home Energy Environment (HEE) 101 largely comprising of boiler 40 and hot/cold water piping and heating system; electrical building wiring 43 capable of receiving high load electrical supply from an AC mains 44 monitored by a Utility Metre 5 or by a Smart Metre 4 or provided via a renewable controller 50 with power from local distributed generation or a high load micro-generator 161, electrical output from a CHP boiler 40 or a electrical vehicle 28 storage or fuel cell device 36 via a vehicle charge cable 30 and vehicle charge control station (VCSS) 27 (that may also be connected to a remote server resource 54 for direct response or remote load balancing control), which provides overall power to distribute via a fuse box 3 through circuit breakers 46 to a plurality of wiring circuits 43, which in preferred embodiments may then be split into a hybrid AC/DC circuit network by placing power devices 59 at appropriate stages on the circuits between the fuse box 3 and the end devices depending on the overall load usage and downstream power requirements of circuits and end devices, or in combination with identifying and substituting end devices for low load energy efficient devices, or including local renewable resources 45 onto said circuit network 43. Where said circuits 43 connect to switches and AC sockets 51 to power a plurality of AC end devices (which may have embedded transformers or AC/DC converters) such as incandescent or CFL lights 26, kitchen appliances 52; such as a Cooking apparatus 35, Washing or Dryer Machine 13, Dishwasher 14, Fridge Freezer 15, Kettle 16 or personal devices such as a hair dryer 18 or Computer Desktop 19 or entertainment devices such as media devices (e.g. Video/Games/DVD) 20 or Television Displays 17 or general end devices 21, or devices such as an LCD Display 49 connected via traditional external AC/DC adaptors 70.

Where said wiring circuits 43 may also connect to power devices 59 such as a Home Energy Server 1 or Zone Energy Modules 24 which both act to convert and control voltages to provide DC power to further downstream sub-circuits 47 or to Light Switch Socket Units (LSSU) 22 or dedicated sockets 31, powering end DC devices such as LED lighting 23, and may also supplement with power provided from a local micro renewable supply (LRS) 45 such as a Solar Panel 25 or Wind 34 micro-generator, or from an electrical storage device 42. Where said power devices Home Energy 1 or Zone Energy Module 24 contain power control modules 38 and 32 that can convert an input AC signal to a desired output DC signal, or can recognize and receive an input DC signal in the event that upstream circuitry 43 contains a similar power device and has already converted the circuit, with said Home Energy Server 1 includes software 170, a portable charger unit (PSU) 37, a consumer display 2, and is shown as illustration powering via direct cables 48 a plurality of low to medium DC loads such as a Laptop 8, a wireless broadband router 9, dab radio 10, a mobile phone 11, MP3 speakers 12, and a Portable charger unit 37 (removed from its docking charge station on HES 1) is further shown in isolation providing power to another mobile phone device 11.

FIG. 2 also showing components of the Energy Monitoring Environment (EME) 102, generally comprising of software 170 and analysis performed on the HES 1 with network access 158 to a remote resources 54,55,56 on a web network 53, overall smart metre 4 or current sensor 6 and circuit breaker sensors 46 segmenting specific circuits, boiler sensor 41 providing heat or water usage data, data feeds from Zone Energy Modules 24, or usage of said Light Switch Socket Units 22, and power load information of renewable sources 45, and additionally sensor unit 39 that may in an embodiment act to provide a reference calibration signal, such as by providing a repetitive signal or phasing through a high frequency AC signal on the network that acts to interfere or produce a measurable response when certain device loads (e.g. from 13-20, 35, 70, 49) are added or removed.

Said overall hybrid AC/DC circuit network being designed, mapped through EME 102 analysis, or modified based on inference and usage data analysis, to minimize AC/DC power conversion losses across the circuits and in end devices, enable micro, mini or energy scavenging renewable devices to be easily connected at appropriate local points to supplement and provide DC power to appropriate devices, to reduce the need for bulky adaptors/AC plugs, enable more rapid integration of low energy devices such as LED lighting, provide intelligent and dynamic control to reduce energy load or wasted device time, and provide monitoring means to enable usage and behavioural patterns to be tracked and analysed and provided to recommendations engines for third party device/product cross-selling or advice consistent with increasing energy efficiency or reducing utility cost.

Figure 3:
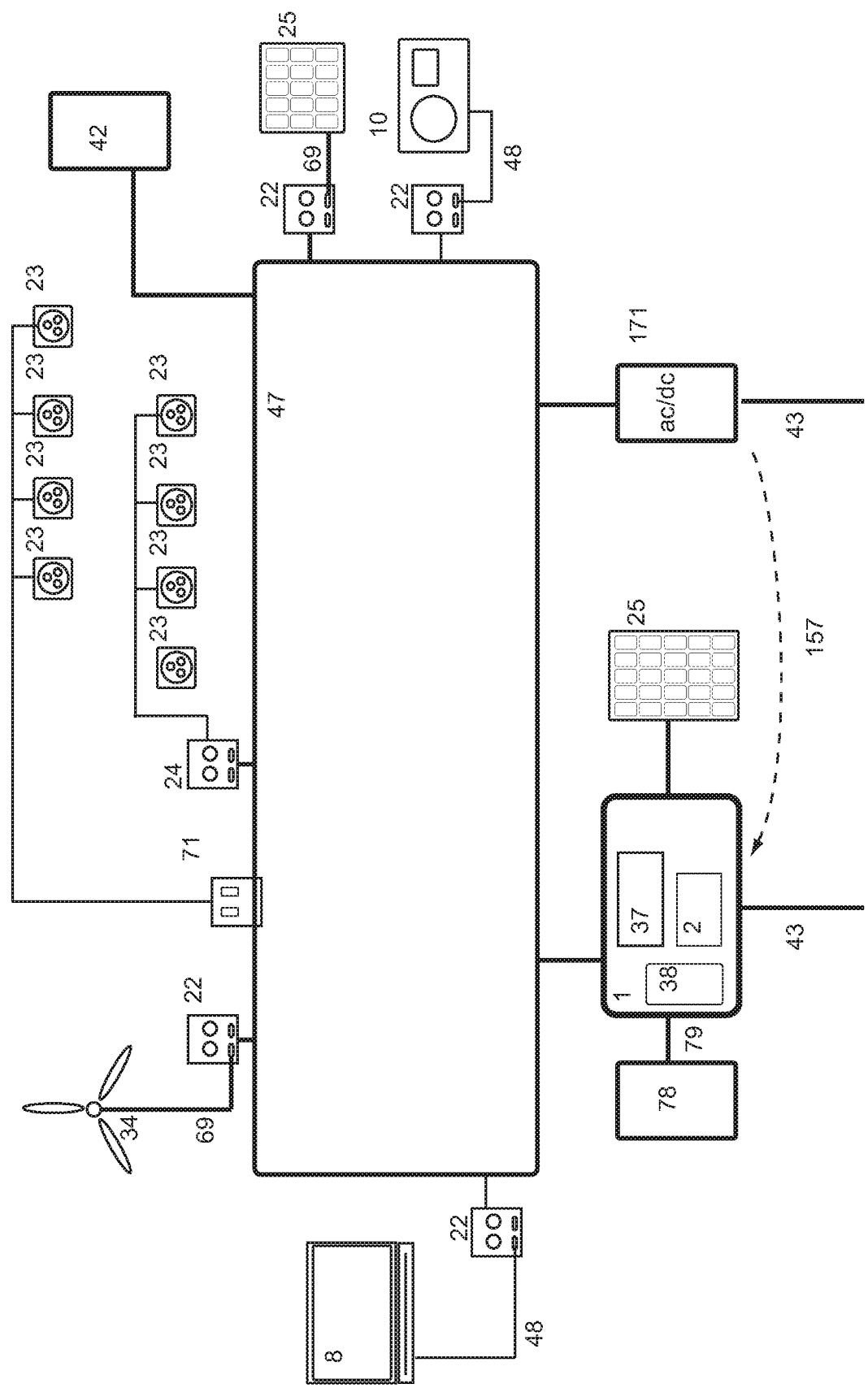
FIG. 3 shows an example of a preferred embodiment of a Home Energy Server (HES) connected to a Local renewable supply and storage, mediating a variable DC power circuit supplying a plurality of LSSU, ZEM, storage and end devices, and receiving an intermittent renewable, storage or AC/DC converted supply.

Referring now to FIG. 3 which shows a preferred embodiment and a key central component of the Home Energy Environment 101 being a Variable DC voltage loop (VDC) 47 monitored/mediated by a Home Energy Server 1 with power circuitry 38, and connecting to a plurality of power devices 22, 24, renewable 45 or storage 42 units, and end low load DC devices e.g. 23, 8, 10, where said network is capable of supporting a voltage within a range (in a preferred embodiment allowed to vary between 12 v and 24 at between 0 and 5 amps), and said end devices are tolerant to voltage variations (for example next generation LED lighting), or are provided their voltage conversion in power device sockets on 1, 22, 24 containing power control modules 32, 38, which may convert voltages depending on end load requirements determined by means of load identifiers in end connectors or intelliplugs 85. Where said HES 1 may convert AC supply power from circuits 43 efficiently via a high spec AC/DC converter or wirelessly communicate and control AC/DC converters 171 connected to the same or other Variable DC Voltage loops 47, or may supplement with local storage 42 (or enable excess power to be harvested from the Variable network (VDC) 47 to charge said batteries when not required), or from renewable sources 25. Where said Variable DC Voltage loop (VDC) 47 is illustrated with additional distributed storage 42, renewable micro wind 34 and solar 25 generation resources that provide supplementary power onto the network via cables 69 to plugs on Light Switch Socket Units 22, which is illustrated providing power to end loads via intelliplugs 85 or connections into Light Switch Socket Units 22 and Zone Energy Modules 24, which might re-use existing AC lighting circuits and light switches 71 by disconnecting original AC 3 amp lighting circuits 43 and connecting directly as a HES 1 or ZEM 24 output circuit.

A central principle of the HEE 101 environment being a step-wise, and retro-fit approach to energy efficiency and low load DC device installation as more lower power DC, cost efficient end devices and solutions become available or as more local renewable capability 45 becomes cost effective and viable and added to the Home Energy Environment 101. For illustration as a first stage a lighting sub-circuit in a room may be converted by an electrician to DC by installing a ZEM 24 to provide efficient AC/DC conversion from a mains circuit 43, to a plurality of new light fittings 23 or by fitting special LED retrofit lamps into original AC lighting sockets (or by removing original inefficient AC/DC converters at the light level and changing original low voltage lights to lower voltage LED or other energy efficient lighting). At a second later stage the whole room might be converted into a Variable voltage DC network by disconnecting the AC supply further 'upstream' at the room junction level by further ZEM 24 installation or connection of the wiring to a HES 1 device, where at this stage existing light switches are either retained or replaced with Light Switch Socket Units 22 supporting additional output sockets 62 for intelliplugs 85 or other low voltage connectors (such as USB 86), where any downstream ZEM 24 units are capable of continued operation by virtue of being already able to handle either a AC or DC input, and consideration may be made by analysis within the ECE (103) or opportunities taken to install further micro or mini renewable sources 45 due to ease or proximity to existing wiring or input sockets 62 on LSSUs 22. Overall load usage, mapping, device inference within the Energy Monitoring Environment 102 may enable the Energy Change Environment 103 to determine that an entire circuit from the fuse box 3, and Circuit Breaker Sensor 46 level may be possible to convert to a Variable Voltage DC network 47, by disconnecting the circuit directly at the fuse box 3 level, and reconnecting to a HES 1 as DC or to local renewable controller 50 capable of outputting DC.

Furthermore software means or remote utility systems 55 of said ECE 103 may pre-model the complexity, and cost/benefit of such a change, as well as the workflow and time/material involved to facilitate and schedule such a change, including identifying any end devices requiring special attention—such as might be needed for an existing extractor fan 77 or shaver point 81 in a bathroom, which might be preferably be substituted with a DC based extractor fan or combined with a wind mini renewable supply 150, or by suitable intelliplug sockets 62 (e.g. for electric toothbrushes), or retained via alternative means such as a trickle charge unit and inversion/rectifier modules. Where planned changes can also be simulated in the ECE 103 and validated with reference to historic usage and consumer behaviour data.

Referring now to FIG. 4 which shows an example of a central key power device 59—the Home Energy Server (HES) 1 in 3D profile FIG. 4A, Side View FIG. 4B and Plan view FIG. 4C, which performs a plurality of roles within the Home Energy Environment (HEE) 101, from mediating/controlling and connecting to Variable DC power loops 47, providing central efficient AC/DC power conversion from a mains supply connected via 65 or controlling wirelessly AC/DC converters elsewhere on the network, and managing/integrating local renewable supplies 45 or back up power or storage 42 of surplus power on the network, providing a plurality of connections 62, 64 and intelliplugs 85 cable, and playing a central part in the usage capture and analysis under the Energy Monitoring Environment (102) and particularly via software 170 on local device inference and circuit load mapping, and communications and analysis under the Energy Change Environment (103) including facilitating presentation of overall data analysis, recommendations, education, advice or third party offers to local consumer displays 159, 11, or via other means such as to set-top boxes/TV displays, or local web pages. Said HES 1, also providing means to track, record and report energy savings directly in detail or measuring adopted Energy Changes or purchase effectiveness in actual usage, to facilitate Renewable energy credits (REC/ROC) reporting to utilities (or remote utility systems 55) and improvements to advice, and direct reporting of benefits and savings. Where said utility reporting may be communicated via the network 158, or via the smart metre 4 or street level mesh networks, Zigbee protocols or other wireless or RF communication means. Said HES 1 containing circuitry and data storage, an embedded display 2 that is preferably touch sensitive, a docking station for a Portable Charger Unit (PCU) 37 (optionally supporting a wireless display) that may also provide back-up power to the HES 1 unit, and control menu buttons 67, positioning feet 68 for stacking on accessory, and side panel 61 containing a plurality of socket connections including female sockets 62 for intelliplugs 85, capable of receiving a standard port such as USB 2.0 or 3.0 86, input/output connections at variable voltage (e.g. in the 12 v-24 example range) 64, and a storage module connection 79, AC mains cable adaptor 65, and communication ports 66 (e.g. Ethernet). Said accessory modules may optionally include battery storage 78, or general broadband/wireless router connectivity 9, or other upgrade modules.

Said HES 1 may optionally connect to a home computer, or link to additional software tools running on said computer or make available web page access/control/reporting screens via a local IP address and URL, to facilitate diagnostics, configuration and modification. Said HES 1 capable of receiving firmware updates and remote management. Said additional tools preferably providing additional data analysis and usage monitoring capability for user profiling—such as tracking computer and related accessories on/off/usage times, such as monitors, back-up drives, printers, routers, hubs, speakers, wireless devices, as well as the patterns of use of such devices, to provide additional high resolution load analysis (and removal of said power usage signatures) from overall load disaggregation, or related efficiency advice, or provide control options for power minimization. Said HES 1 software tools may also provide survey tools to enable greater validation of inferred device and circuitry maps, additional processing power for complex analysis, options to add/remove new components to the power network or set tolerances and default or mode based behaviour, fault analysis, psychological profiling and survey tools on energy use and change behaviour, additional visualizations and modelling tools to illustrate benefits or provide reference to peer group models.

Referring now to FIG. 5 which shows a functional diagram of a key Power Control Module 38 as found in a HES 1 device, in an extended form in overall house renewable controllers 50 or in a reduced form in ZEM 24 modules, where said Power Control Modules 38 perform overall variable voltage network control of a DC Loop 47, and mediates a range of power supply options to convert to an output DC voltage (preferably in the 12-24V range), and supports communications with other devices (e.g. as part of the overall Energy Monitoring Environment 102) or for control purposes. Said module 38 receiving input power from renewables 45 such as a solar device 25 or wind device 43 connected to sockets 64 on the HES 1, back-up AC mains supply via an AC circuit 43 and power cable to socket 65, or from a battery storage unit 78 connect to sockets 79 on the HES 1, and comprises circuitry that performs current protection on said inputs and charge circuit protection 74 and charging of said battery unit, Micro controller switching 72 and current sensing 73 and combination of the various loads to produce a desired end voltage output Vout 75 and current requirement, for output ports 64, or 62 via power delivery modules 32, or Variable DC Loop 47. Where in a preferred embodiment said microcontrollers 72, 82 may perform an algorithm 80 that has the step of measuring current 73 and intermittency across input sources 64 from Solar 25 and Wind 45 and providing this through to the output at an appropriate voltage if it is sufficient for loads on the system, or a step of combining or replacing this with a local battery source 78 that has been pre-charged preferably from said renewable sources, or from a mains supply when power unit cost is low, if that is sufficient for end loads and subject to user or system parameter minimums for battery storage levels, or if insufficient balancing or replacing with AC back-up mains power efficiently converted via a high-spec AC/DC converter to a preferred target output voltage. Said Power Control Module 38 having an overall Microcontroller 82, display 2, and communication means 81 (e.g. powerline, Zigbee or other wireless means) to communicate with aspects and changes within the Home Energy Environment 101, and to dynamically respond to overall changes in the load requirements of the DC loop 47 or connected devices.

A particular feature of said Power Control Module 38 and resilience of the Variable Voltage DC (VDC) network 47, is it's tolerance for a variable range of Vout 75 voltages due to the localized step conversion in the end Power Delivery Modules 32 (FIG. 9) within the ZEM Modules 24, LSSU's 22, and HES 1 socket layer connectors 62 for intelliplugs 85, and the ability of end intelliplugs to themselves select a voltage/current to a desired parameter. This has the benefit of enabling the HES 1 microcontroller 82 to vary the overall variable voltage level and output current requirement, based on the overall current (or expected usage) load level of end devices on the variable voltage DC network 47, dynamically in order to minimize energy loss across the environment or to preferentially leverage available renewable supplies at the appropriate level. This overall has a significant advantage of reducing the need to maintain a high Voltage Vout 75 high load capability if end devices do not require it, and to connect the appropriate use of resources to the appropriate needs as well as rapidly adapt to the intermittent nature of renewable supplies.

This has further advantage when combined with larger scale renewable or hybrid systems such as CHP output (e.g. from a fuel cell electricity generation capability powered by a gas supply burning), or when time based pricing is in place over overall AC supply, since adjustments can be made to variable voltage networks, storage solutions based on daily peak cycles of behaviour as well as on thresholds for efficient use of macro renewable sources.

Referring now to FIGS. 6A-6C which show an example of a Zone Energy Module 24 hub FIG. 6A connected to a range of devices, and in plan view in FIG. 6B and side view in FIG. 6A, which is a reduced form of the Home Energy Server (HES) 1. Said ZEM 24 is designed to form a sub-branch on a DC circuit, or form a AC/DC conversion point where supplied from an AC Mains, to easily integrate into a wall/ceiling and enable a room or zone level migration, and connect and supply a series of local end loads as well as support connecting suitable input renewable supplies 45, where said module supports communication and has control circuitry, power control module 38 and selectively power delivery modules 32, but does not need the additional intelligence or processing, software and connections of the HES 1. The Zone Energy Module 24 is shown receiving both an AC supply 43 and a HES 1 variable voltage DC supply 47, and receiving an indicative micro-wind or mechanical renewable 58 (e.g. for inclusion in a waste water system, or connected to an exercise device) renewable supply and connecting to a series of end devices such as LED lighting 23, Light Switch Socket Unit 22 powering a digital radio 10, and a general device 63. Said module has a removable cover as cables 43, 47, 48, 69 pass through slots 76 in the outer casing and may be secured internally to appropriate connector modules, where connections may be direct to a Variable Control Network 47 or to a Power Delivery Module 32 on a Variable control network 47, or connected to a Power Control Module 38, depending on the nature of the subsequent branch or end load device.

FIG. 7 shows an in-situation example of a Zone Energy Module 24 in a room, being in this case an illustrative bathroom, where the ZEM 24 is embedded into a ceiling—for example in combination with a lighting or speaker unit 142, and receives both a AC mains circuit 43 and optionally a DC Variable Voltage supply 47, and provides an output to a local arrangement of low power or LED lighting 23, a Light Switch Socket 22 for control and additional intelliplug socket 62 availability, a wall extractor vent 77 and a hybrid shaver socket 81 supporting additional intelliplugs, and is also optionally able to receive inputs from extractor vent 77 connecting via 150 to a delocalized external wind generator 149, or to a heat energy scavenger material 78 (for example a thermo-electric material), that might wrap a hot or waste water tank or piping.

Said hybrid shaver socket 81, could optionally receive a direct AC 43 circuit supply but preferably converts power provided from the DC Variable Voltage VDC 47 network for the end socket requirement, alongside an alternative low power intelliplug socket—which provides a more preferable and less cable intensive way of connecting say an appropriate electric tooth brush or shaver device. Said extractor fan 77 may similarly require an AC input but is preferably a low power DC device. In a preferred embodiment said extractor 77 supports a storage battery unit, and is trickle charged via the DC variable Voltage for rapid bursts of activity, or is charged by means of an external wind renewable device 149 that affixes by means of a connector 150 onto an extractor tube passing through the wall. Said extractor 77 thereby operates independently as a renewable supply and storing power to either provide a power contribution to the DC Variable voltage network when under utilized or a buffer of stored power for extractor fan usage, and also in basic operation acting as an unpowered extractor when in generating mode.

Said thermo-electric material 78 in an example preferred embodiment being intelligently controlled to scavenge waste heat when the heat is no longer needed (e.g. waste water or cooking surfaces), or if excess heat was produced for an application and not used. Said overall Energy Monitoring Environment providing cues and data based on direct sensing apparatus on water flow, or based on triage or associated usage behaviour of electricity, hot water/boiler supplies.

Referring now to FIGS. 8A-8E which show a Light Switch Socket Unit (LSSU) 22 together with a Light Switch Socket Module LSSM 60 containing a plurality of power delivery modules 32 and intelli-plug sockets 62, 82, and showing various intelli-plugs 84, 85 and standard format connectors 86 (e.g. USB). FIG. 8A shows a 3D view of the LSSU 22, FIG. 8B a face view, FIG. 8C a side view, together with example Light Switch Socket Modules LSSM 60 supporting sockets for connecting a voltage selector intelliplug (FIG. 8D) or standard format connector (FIG. 8E) such as a USB plug 86 or USB connector peripherals (e.g. a USBCELL rechargeable battery 90). Said LSSU 22 providing a convenient way to provide lighting control 83 of low voltage lights on a localized Variable Voltage VDC Network 47 and capable of supporting interchangeable LSSM 60 units with power delivery modules 32 powering one or more types of socket such as a intelli-plug 82 input format, intelli-plug output formats, round socket 64, or optionally other formats such as Ethernet (when combined with communications e.g. a powerline or wireless protocol) or custom adaptors, or via embedded sockets 87 that enable a fixed wiring connection to be made into the reverse of the unit through the wall (e.g. when connecting a permanent installation such as an exterior light or renewable source).

Said LSSM power delivery module converts the Variable DC Voltage Supply to standard default parameters 5V, 500 mAh on the intelli-plug central connections or to a desired voltage and current level based on parameters encoded within the intelliplugs. Said intelliplug format in a preferred embodiment has a central form based on a USB 3.0 standard providing 5 data/2 power pins, and additional vertical prongs on either the central top 91 or the central bottom 92 or both 85, that can support additional data/power (and optionally mechanical release) contacts that can mechanically and electrically connect with corresponding pins 89 and 88 recessed with the intelliplug sockets 62, 82. The physical shape precludes an incorrect connection and enables different types of sockets to be tasked to different functions where preferably the cross format with both upper and lower recesses is designated for generic input but used in full form for external power input purposes where a cable 69 from a renewable supply provides power via the upper 91 and lower 92 prongs to pins 89 and 88 connected in the socket to a Power Delivery Module 32 or overall Power Control Module 38. Where the socket is T shaped without a recess 89 it can only support output power delivery via the central pins or the lower prong 92 and recess pin 88 (that might preferably provide a higher default voltage such as 12 v and have a higher current limit) and might provide power via a cable 48 to a end device such as a printer of laptop device based on the intelliplug parameters, similarly when no side prongs are present the rectangular socket can only accept a standard format USB 2.0 or 3.0 connector e.g. a USB peripheral such as a USB charge cable for an MP3 device/phone or a USBCELL rechargeable battery 90, or can receive an intelliplug of similar physical format to provide power based on parameters in the intelliplug. Similarly an external plug might combine a multitude of intelliplugs, to connect into two or three sockets 62 on a LSSM, to receive a higher voltage/load than a default limit on a single socket 62.

The convenience of the LSSM 22 architecture on a Variable DC (VDC) network 47 combined with embedded variable Power Delivery modules 32, and intelliplug 85 format, provides for an ability to easily connect delocalized renewable sources close to the room or LSSM location (e.g. from a nearby window or energy scavenging device), or to connect locally a variety of low load or DC applications, and optionally to connect communication cables) and at the same time provide a preferred re-use of circuitry—such as existing 3 amp lighting circuits which have been disconnected from an upstream AC supply at the room, or extended ZEM zone or HES 1 circuit loop level 47. Similarly the architecture provides a new build approach for installing a dedicated DC network alongside a conventional AC 13 amp socket network. A further point is about accessibility—since AC sockets are historically viewed as messy, with end load devices generally being placed and fixed in location, such sockets were generally hidden out of view or not easily accessible—resulting in being left on more frequently, whereas today the higher number of devices, particularly portable devise are frequently moved and therefore require more accessible (and preferably smaller) connectors, a higher number of sockets and connection apparatus with less material or bulky adaptors, that can provide efficient and appropriate supply.

Figure 9:
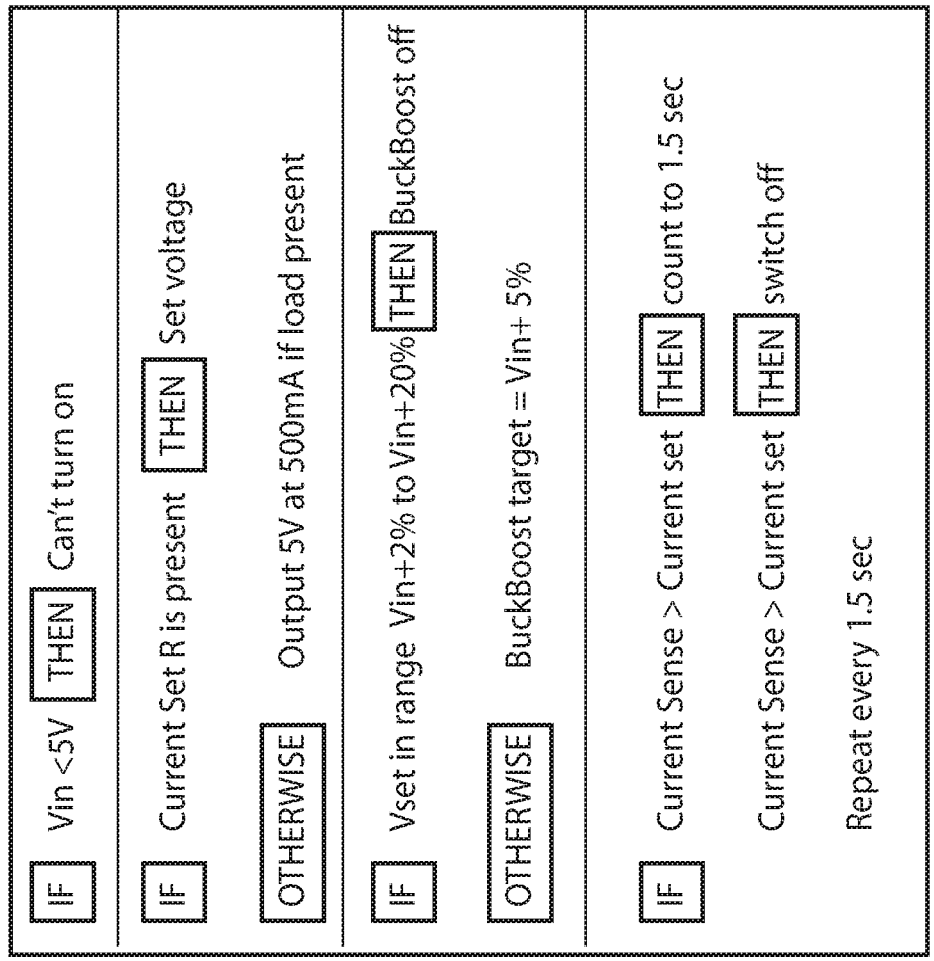
FIG. 9 shows an example Power Delivery Module for a Light Switch Socket Unit or ZEM capable of receiving a variable voltage input, communications, and providing an appropriate output voltage dependent on parameters of an external intelli-plug or to standard connectors.

Referring now to FIG. 9 which shows a functional diagram of a key Power Delivery Module 32 for embedding in a Light Switch Socket Module (LSSM) 60 for intelliplug sockets 62, or selectively in a Zone Energy Module 24 output connection, or for the HES 1 intelliplug 62 sockets. The primary function of said module 32 is to convert the supply voltage and current (typically from a variable DC network 47) to the desired parameters of the intelliplug 85. This is achieved through specific parameters or identifiers in the intelliplug, that in a preferred embodiment are determined by resistors for current, voltage and amplification parameters. In the preferred embodiment of the intelliplug being based on a central USB 3.0 bar containing 5 data pins, this could be achieved through resistors being placed across circuitry between the common ground data pin 162 and other data pins, such as a current set resistor 104 between the common ground pin 162 and a second data pin 163, a voltage set resistor 105 between the common ground pin 162 and the third pin 164, and a amplification set resistor between the common ground 162 and a fourth resistor 165, leaving a spare fifth data pin 166, together with power pins 167 and 168 for receiving the desired voltage and current 99. Where said Power Delivery Module 32 would first measure these resistances across corresponding pins to and a common ground to determine the current set parameter 96, voltage set parameter 97 and amplification 98 and with control via a central microcontroller 93 drive an output voltage linear regulator 95 to control the output voltage 99, with Said Power Delivery Module 32 also comprising of an input current protector 71 (on Variable DC circuit supply 47), current sensing circuitry 73, a Microcontrolled switch 72, DC/DC Buck-Boost DC voltage regulator 94 and external communication 108 (such as Zigbee). Where said microcontroller 93 may execute an algorithm 107 to respond dynamically to different resistor parameters in attached intelliplugs, and by simply using alternate resistor parameters in different or dedicated intelliplugs for different devices, a plurality of different end load devices may be easily connected to the LSSM 60 or HES 1 sockets 62 and receive a converted voltage to a desired level, and from a supporting Variable DC network that can vary over a range to minimize energy waste or provide additional higher load capability when required, and be tolerant to volatility in supply by intermittent renewables. Similarly by similar use of data pins and resistor parameters various input cable intelliplugs may be configured to inform the Microcontroller of typical load ranges, or provide additional input by means of prong 91 and pin 89 direct to the Variable DC network 47.

Figure 10A:
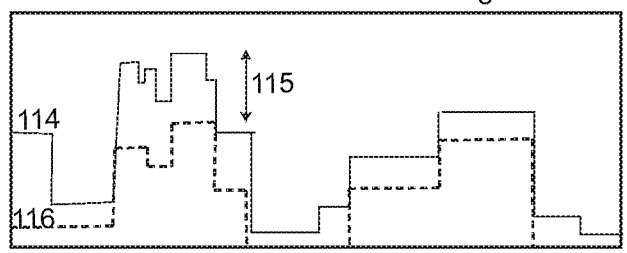
FIGS. 10A-10D show components of a sensing apparatus around a fuse box within the Energy Monitoring Environment.
Figure 10B:
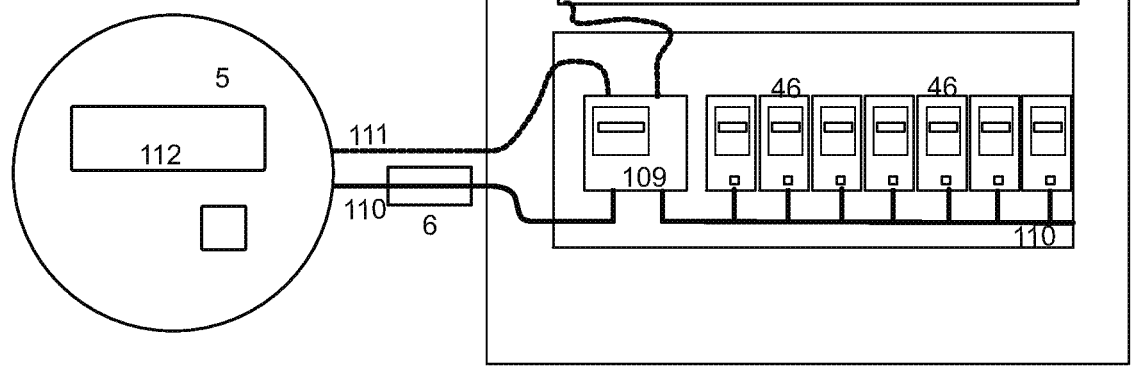
Figure 10C:
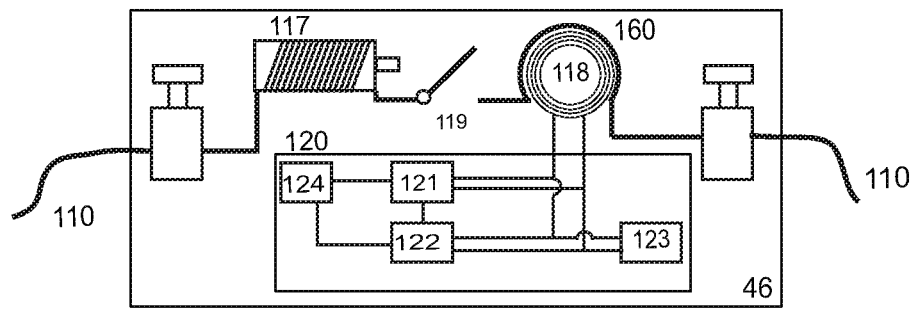
Figure 10D:
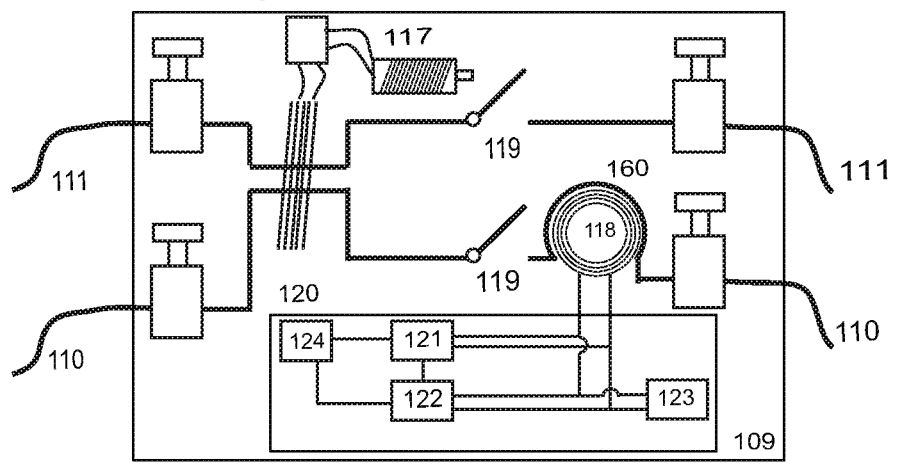

Referring now to FIGS. 10A-10D which show components of a sensing apparatus around a fuse box 3 within the Energy Monitoring Environment 102. FIG. 10A shows indicative real-time current measurements 113 for usage and appliance inference analysis. FIG. 10B shows an example sensor arrangement within a Energy Monitoring Environment 102, comprising a utility metre 5 with display/counter 112, an overall system load sensor 6 on a live wire 110 adjacent to a neutral wire 111 and at least one Sub-circuit load sensor 46 (in this example embedded in a RCD 109 or MCB unit 46). FIG. 10C shows an example MCB with embedded circuit breaker sensor (CBS) 46, and FIG. 10D shows an example RCD sensor 109. Where said sensors 6 or 109 are capable of monitoring the overall system load 114 shown on 113 and communicating the current signal 114 as illustrated in FIG. 10A, which measures the overall impact of devices in use across both the AC 43 and Variable DC 47 circuits, and also shows the load measurement from an example sub-circuit CBS sensor 46, as 116, that might for example correspond to a high load circuit such as a kitchen with washing and kitchen apparatus, said segmentation enabling analysis of remaining signals by removing the high load 116 signal from the overall signal 114 to focus on medium to lower signal loads. Said signals changing over time to produce magnitude changes e.g. 115 that may be sufficient to determine unique signatures for specific end-devices on the network as they are turned on, or are in use, or are shut down, or where said signatures are learnt through neural network algorithmic means, through consumer survey or Peer group comparison and look-up, through further algorithmic disaggregation means under signal theory such as deconvolution, or through forward simulation and convolution of a guessed or assumed appliance, or through further exploitation of additional data cues, from direct sensors, calibrator sensors on the network, or other sensors within the Energy Monitoring Environment such as on water or gas utility systems that have a correlation to energy usage (e.g. electric showers, kettles filled up recently with water, washing machine devices, lighting use changes correlated with bathroom use), which enable both device inference as well as mapping of circuit and device use across the Home Energy Environment.

Said embedded circuit breaker sensor (CBS) 46 is illustrated in FIG. 10C, where a live wire 110, can be interrupted by a switch 119 and operation of a solenoid coil 117 or bi-metallic movement of a heat strip 125, in the event of a short-circuit or high current draw as per normal MCD circuit breaker operation, but said circuit breaker also comprising an embedded sensor such as a shaped current load conductor 160 arranged to be congruent with a current flow sensor coil 118 (that may measure by induction) arranged around the live wire 110, to provide a high accuracy current change measurement of the load on the 110 wire, and connected to embedded circuitry 120 that contains a communication means 122 (for example wireless or a Zigbee protocol), a lithium cell, charge and power control circuitry 124 that may preferably scavenge power by using a differential voltage across said flow sensor coil 118 to provide power to the circuitry 120, central microcontroller control circuitry 121 (generally comprising of a CPU, Analogue to digital converter, and circuitry to measure the AC signal quality and harmonic distortion), and may optionally be combined with a powerline/X10 comms mechanism 123 to place a reference signal onto the circuit 110 to provide communication elsewhere onto the network, or to provide a high frequency signal for interference or calibration measurement elsewhere (such as in the HES 1 or End calibrator 39 sensor/signal devices). A similar embedded circuit breaker sensor (CBS) 109 is illustrated in FIG. 10D which shows a RCD—

Residual Current Device which supports a solenoid and current overload switch for the neutral wire 111.

Referring now to FIG. 11 which shows in FIG. 11A an indicative circuit schematics 126 and 127 for said communicating Circuit Breaker Sensors 120 capable of self power by energy scavenging, and communicating, measuring a load or placing a reference signal 123 onto the circuit, and FIG. 11B shows an indicative embedding of said circuitry 120 inside or within the side panels (indicated by 129 face plate plastic) of an indicative standard format circuit breaker 46, which shows said live wire 110, passing through a flow sensor coil 118 congruent with a shaped current load conductor 160, attached to circuitry 120, where said live wire 110 can be interrupted by a sprung switch 119 and operation of a solenoid coil 117, where said circuitry 120, may in the event of an overload be able to provide diagnostic information relating to the current prior to the over-load, or communicate fault status to a remote device, or provide specific analysis of which end device was in operation prior to the over-load. Where said circuitry 120 may be suitably encapsulated or insulated from heat/spark dissipation from sink/catcher 128, or suitably located in the outer plastic casing 129.

Referring now to FIG. 12 which shows an indicative combination of the Energy Monitoring Environment 102 via software 170 on the Home Energy Server 1 of the Energy Environment 101 involved in enabling the Energy Change Environment 103 to communicate a third-party recommendation 134 (a more efficient kettle in this case) via the remote recommendation engine 56 to the HES 1 and wirelessly linked Customer Display 11, relating to in this example usage of Kitchen apparatus kettle 16 identified by a load spike 132 on the current sensor 46 measurement 116 or via the overall current sensor 6 and measurement 116, where said load spike signal signature 132 being sufficient to identify the nature of the end device 16 or by comparison with a signature database in a remote resource 54, or deduced from a correlation of water flow measured by sensor 132 inferred to correspond to a typical quantized volume of water from a tap such as 133 that might correspond to a kettle device. Said volume metric information of said tap usage 133 assumption, combined with general behaviour analysis of the HES on how many consumers are using devices in the home, or resident in the home, may further allow the Energy Monitoring Environment to deduce typical usage profiles of said kettle 16, such as how frequently, or whether it is always filled and boiled but not used (e.g. deduced from a smaller volume of water top-up measured prior to load spikes 132), in order to tailor recommendation advice directly to the user—or a more relevant product (e.g. 1 cup kettle boiler—combined with a cost saving illustration based on the observation of frequency and usage of said kettle device). Similar advanced inference is possible across a range of household devices, from lightning, washing, cooking, media, computing and other energy devices. Furthermore, said Energy Change Environment may enable an overall profile and energy Type to be deduced for the user and compared to peers via remote resources 54, or with overall models at utility systems 55, to enable changes and further related cross brokering of third party services aggregated via a recommendations engine 56. A central principle of said Energy Change Environment is to facilitate recommendation of products and services that are environmentally friendly and serve to reduce energy or utility waste, and provide tracking and reporting information to validate that such projected savings are achieved in practice to enable ROC/REC environmental credits, or validation and scoring of the credibility of third party offerings. Said overall scoring providing consumers the ability to search for green products and services on a preferential basis as well as third-parties to be made aware and take advantage from the overall savings impact they are enabling. Given the benefits to third parties, such an overall Energy Change Environment may have the effect of working as a virtuous cycle, whereby end consumers/households reduce their energy and utility cost and gain discounted products/services, energy retailers can claim the ROC/REC incentives for helping to facilitate such transactions, and third parties can provide such products and services direct to consumers at lower overall distribution margin than in other channels, or with reduced marketing expenditures given the precise targeting enabling further considerations on lower margins.

A further example illustration of the Energy Change Environment can be seen with reference to the overall current measurement 113 showing a large generally uniform load 116 as measured on the CBS sensor 46 prior to the kettle 132 activity, which in this example relates to a usage of a washing machine 13 with a high load electric motor, said overall enclosed volume provides an indication of the high energy run cost of such an appliance. Analysis of such a profile and comparison with reference signals may enable the system to deduce the temperature of the washing cycle (e.g. 60 degrees), and provide a recommendation of a migration to an alternate washing powder capable of the same performance at a 30 degree temperature, and provide an illustration of the cost savings achievable by changing powder. Said information could be brokered to third parties e.g. 135 to cross sell to the product, or provide a discount coupon or offer to the utility company systems 55 to include on a future bill statement. Said overall Energy Monitoring Environment being able to log/track the overall consumers usage of washing (or other apparatus) in terms of frequency and type of use, and aggregate overall demand across other customers via the utility systems, and broker such information to suitable third parties.

Similar analysis in combination with measuring water, gas usage for cooking, washing, heating and other activities could be incorporated in a similar manner, enabling a lifestyle profile to be determined, potentially down to measuring 'electric toothbrush' use events, in terms of frequency, time, and duration, for precise cross marketing opportunities. Similar monitoring could also be used to determine faulty or underperforming devices, and schedule repair or maintenance activity. Similarly by correlating heating monitoring activity with electricity usage activity, advice can be given to consumers about re-programming boilers—in the event households are not occupied, or under utilized, as well as the option of dynamic control—e.g. by providing this advice or illustrating cost remotely to a mobile display device with the consumer to enable them to turn down or off heating capabilities, or defer control to the Energy Change Environment, which may have already learnt behaviour and expected routine arrival time and anticipate heating requirements.

Referring now to FIGS. 13A-13, which show indicative examples of solar based Local Renewable Supplies 45 capable of being installed in or on the outside of a window or window frame 143, and connected to a Light Switch Socket Module 22 or ZEM 24, along with an example mechanical or potential energy micro generator 158 embedded within a floor or stairs surface 157 (or for example in an exercise device or by means of piezo-electric coils in trampoline springs). FIG. 13A shows an example solar film formed into a rollable blind 57 affixed to a window frame 143 and shown in a storage position, and FIG. 13B shows said solar blind in a deployed configuration capable of generating an output—where the Energy Change Environment, might preferably have authority to automatically deploy the blind by means of a motor 144 at suitable times, on a schedule, or in the absence of activity in the house or room zone. Where said solar device 57 provides an intermittent supply to the Variable DC Voltage network 47 or to a storage device on that network, by connecting with a cable 69 to an intelliplug on a nearby Light Switch Socket Unit 22. FIG. 13C shows a further example being a solar 'Venetian blind' acting as a window shutter 145 on the exterior (or interior) of a window frame 143, where shutters 145 support photo-voltaic strips 146 capable of generating power, and preferably a mechanical slide action means to re-angle by 90 degrees as on regular blinds (or support reflective means on the underside, or preferably tracking an optimal sun elevation angle), and similarly connected via a cable 69 into a nearby Light Switch Socket Unit 22 on a variable voltage DC network 47. In a further embodiment said Venetian shutter could contain hollow tubes capable of connecting to a household piping, providing a solar/thermal means of heating water to a storage tank. FIG. 13D shows an alternate shutter supporting a conventional Solar panel apparatus 148, in the open configuration and FIG. 13E in a closed configuration 147, where alternatively said shutters could slide to enable a PV surface to be constantly exposed, and again provides a ready means of installing a solar device on a wall/window and connectivity via a Light Switch Socket Unit 22 into a nearby Variable DC Voltage network 47. Said solar PV or solar thermal Venetian blinds providing an easy means to attach a renewable device to houses, or flat/apartments without ownership/control of the roof, and potentially an aesthetic means in the context of many countries within communities, and act as 'Plug & Play' easy to install solutions, and generally sufficient to provide intermittent DC power for direct connectivity via the Variable Voltage DC network 47 to general portable peripherals such as mobile phone/media chargers 11, router/wireless connectivity devices 9, or potentially additional computing accessories.

Referring now to FIGS. 14A-14D which show examples of wind based Local Renewable Supplies capable 45 of being installed on a wall 151 or roof and connected to a ZEM 24 or house renewable controller 50, FIG. 14A showing an example hybrid solar/wind/storage device 152 as a form of roof vent, which may for example contain storage cells 42, solar panel layers 146, and a wind micro-generator 149, and might further act as a roof vent/extractor in basic operation, and is shown connecting to a Variable voltage DC loop or house renewable controller 50. FIG. 14B shows an example of said wind device 149 attached to a side wall 151, and to a wall connector 150 which might for example affix to an existing extractor fan 77 location, and also provide an extractor fan function in basic operation. FIG. 14C shows an example of the wind-generator device 149 in isolation, showing more clearly a connector 150 and cable connection to a LSSU 24 device. Said aerodynamic blades being only to serve as illustration, but may in other embodiments be collapsible and storable against a wall when no wind resources are available, made of a transparent material to be less obtrusive, and support at least one aerodynamic blade. FIG. 14D shows an example of a solar tiles 154 for affixing to a roof or wall, that provide another example of an aesthetic renewable capable of integration into certain types of housing, and providing power into a house renewable controller 50. The above illustrations and FIGS. 13A-13E, showing a plurality of renewable supplies 45 that might be de-localised across a household, and illustrate benefits of connecting anywhere into nearby LSSU 22 and variable voltage DC network 47, or in larger installations for connection into a central house renewable controller 50.

FIG. 15 shows an example stacking of a modular HES 1 casing with a battery storage unit 79, and supporting a removable Portable Charge Unit (PCU) 37 which may optionally act as a wireless consumer display 155 capable of displaying energy usage and advice/recommendations. Said PCU 37 is shown in a deployed configuration charging a mobile phone device 11, or capable of powering a laptop 8 type device.

Although the invention is mainly described and illustrated with reference to the described embodiments it is expressly understood that it is in no way limited to the disclosure of such preferred embodiments, but is capable of numerous modifications within the spirit and scope of the present invention as defined in the accompanying claims. By way of example reference is made to a HEE (Home Energy Environment) implementation of an Energy Environment, but the same embodiments and inventions would apply to an Office Energy Environments, Retail Energy Environments and to larger facilities, or as guiding design and power provision principles across blocks of mass housing.

What is claimed is:
1. An energy provisioning system, comprising:
a DC network;
one or more solar panels;
one or more DC/DC voltage regulators connected to the DC network;
an energy storage connected to the DC network, wherein the energy storage is charged by the one or more solar panels;
wherein the DC network is connected to a module comprising an inverter or an AC/DC converter;
one or more load sensors configured to perform load measurement; and
a microcontroller configured to, based at least in part on the load measurement performed by the one or more load sensors, manage power contribution from one or more of the energy storage, the one or more solar panels, or an AC mains supply, wherein the managing of the power contribution comprises to:
determine that a specific end-device has a specific load signal, wherein the specific load signal has one of the following: a low load signal, a medium load signal, or a high load signal;
remove the specific load signal from an overall signal from the load measurement;
determine unique signatures for specific end-devices on the DC network based on magnitude changes over time of the overall signal with the specific load signal removed; wherein the unique signatures are determined using a model, wherein the model implements a neural network technique; and
dynamically control the specific end-devices based on learnt behavior from the unique signatures.
2. The energy provisioning system of claim 1, wherein the microcontroller is configured to provision power from the energy storage based at least in part on an energy storage level.
3. The energy provisioning system of claim 1, wherein the microcontroller is configured to provision power from the AC mains supply based at least in part on a power unit cost.

4. The energy provisioning system of claim 1, wherein the microcontroller is configured to provision power from the AC mains supply based at least in part on an energy storage level.

5. The energy provisioning system of claim 1, wherein the microcontroller is configured to combine or replace power provided by the one or more solar panels with power provided by the energy storage or the AC mains supply.

6. The energy provisioning system of claim 1, wherein the microcontroller is configured to vary at least one of a voltage level or output current based at least in part on a load level of one or more end devices.

7. The energy provisioning system of claim 1, wherein the microcontroller is configured to vary at least one of a voltage level or output current based at least in part on a current load level of an end device.

8. The energy provisioning system of claim 1, wherein the microcontroller is configured to vary at least one of a voltage level or output current based at least in part on an expected load level of an end device.

9. The energy provisioning system of claim 1, further comprising a microcontrolled switch controlled by the microcontroller.

10. The energy provisioning system of claim 1, further comprising a current sensor configured to measure at least one of current or intermittency of the one or more solar panels.

11. The energy provisioning system of claim 1, wherein the DC/DC voltage regulator comprises a Buck-Boost voltage regulator.

12. The energy provisioning system of claim 1, further comprising at least one of a wireless communications interface or a powerline communications interface.

13. The energy provisioning system of claim 1, wherein at least one load sensor is at a fuse box or smart meter.

14. The energy provisioning system of claim 1, further comprising: a circuit breaker comprising an embedded sensor.

15. The energy provisioning system of claim 14, wherein the circuit breaker comprising the embedded sensor is configured to perform at least one of measuring a load or placing a reference signal onto a circuit.

16. The energy provisioning system of claim 1, wherein based at least in part on the load measurement performed by the one or more load sensors, the microcontroller is configured to combine power provided by two or more of the energy storage, the one or more solar panels, and the AC mains supply.

* * * * *